April 12, 1966  C. E. EVANSON ETAL  3,245,360
APPARATUS FOR FORMING A CONFECTIONERY PRODUCT
Original Filed Sept. 22, 1961  11 Sheets-Sheet 1
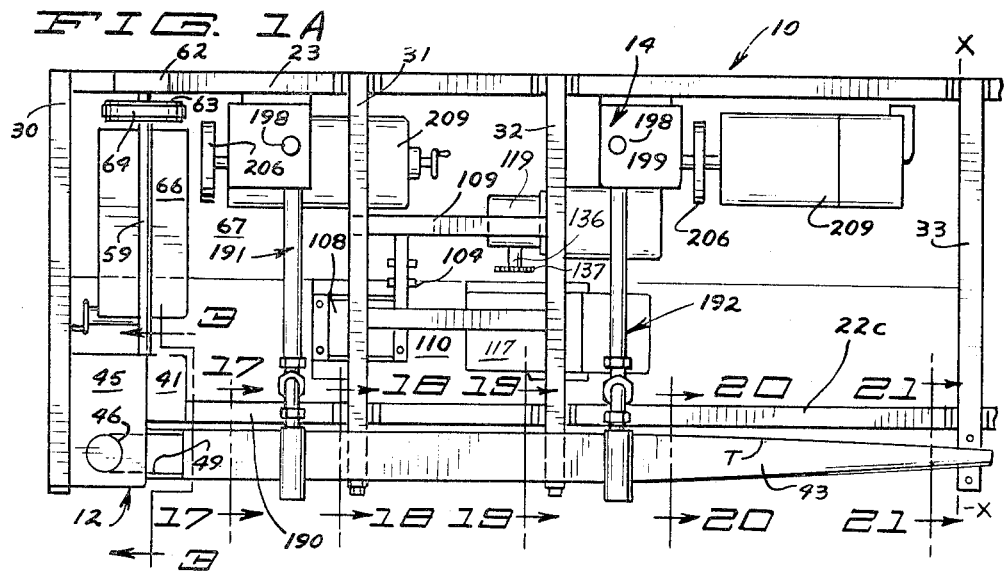
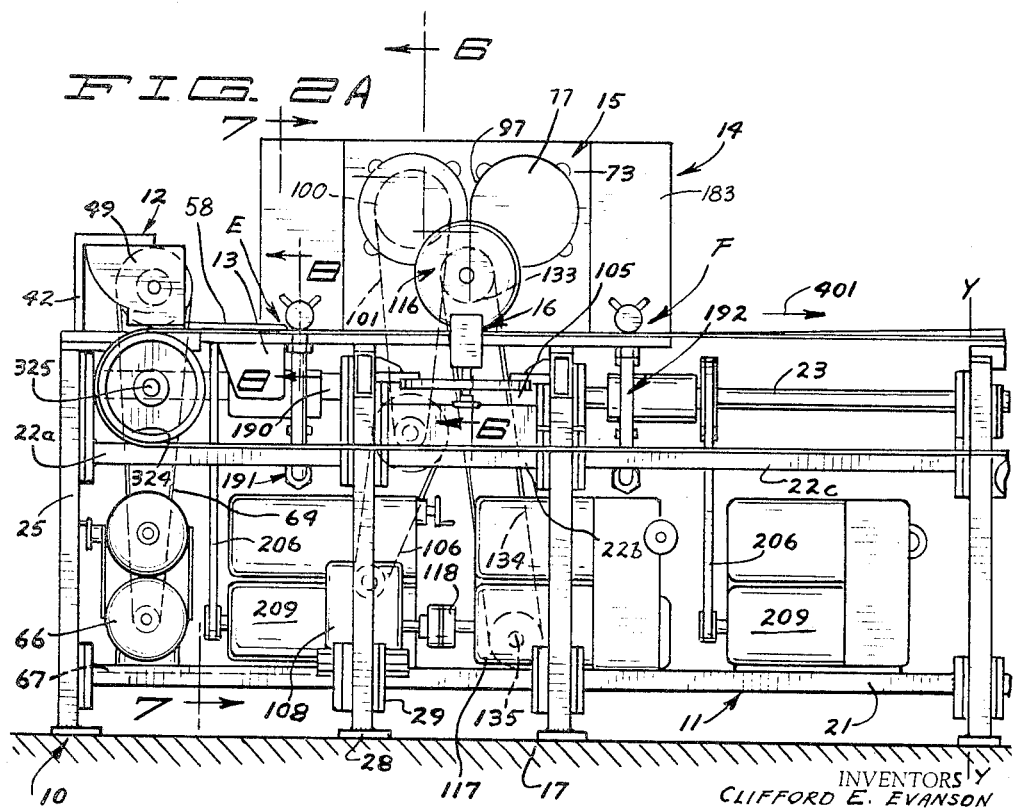
INVENTORS
CLIFFORD E. EVANSON
DONALD E. JORGENSEN
ARTHUR W. ALBRECHT
CLARENCE F. BLOCK
EINER W. LARSEN
BY
Dugger, Braddock, Johnson & Westin ATTORNEYS April 12, 1966 C. E. EVANSON ETAL 3,245,360
APPARATUS FOR FORMING A CONFECTIONERY PRODUCT
Original Filed Sept. 22, 1961 11 Sheets-Sheet 2
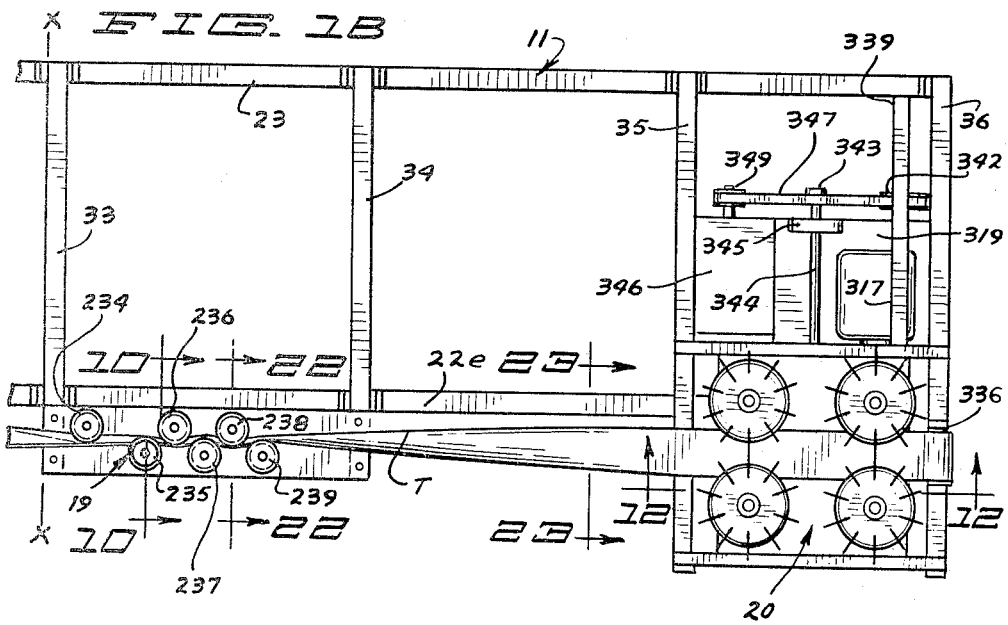
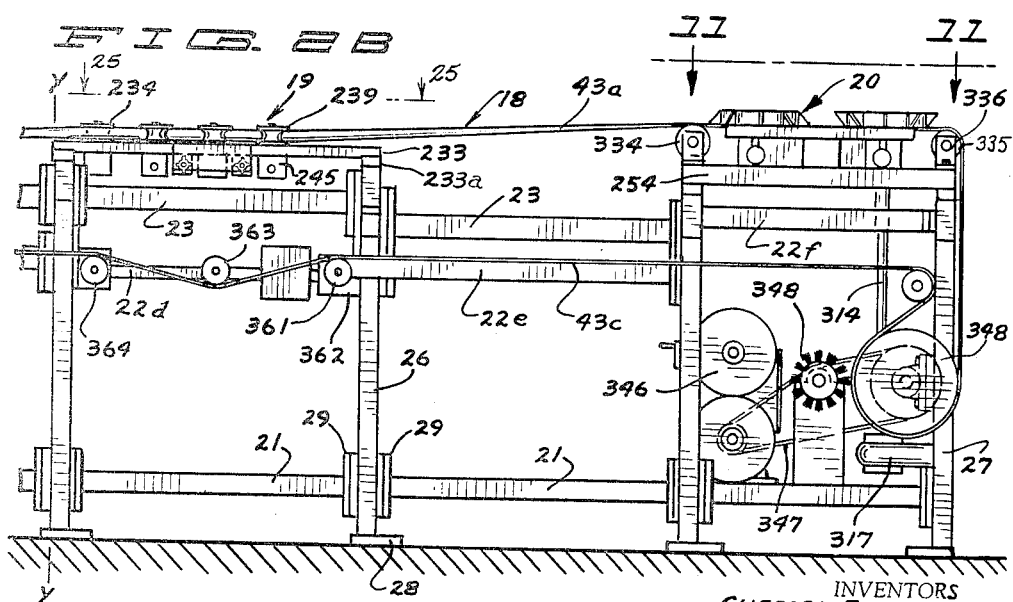
INVENTORS
CLIFFORD E. EVANSON
DONALD E. JORGENSEN
ARTHUR W. ALBRECHT
CLARENCE F. BLOCK
BY EINER W. LARSEN
ATTORNEYS

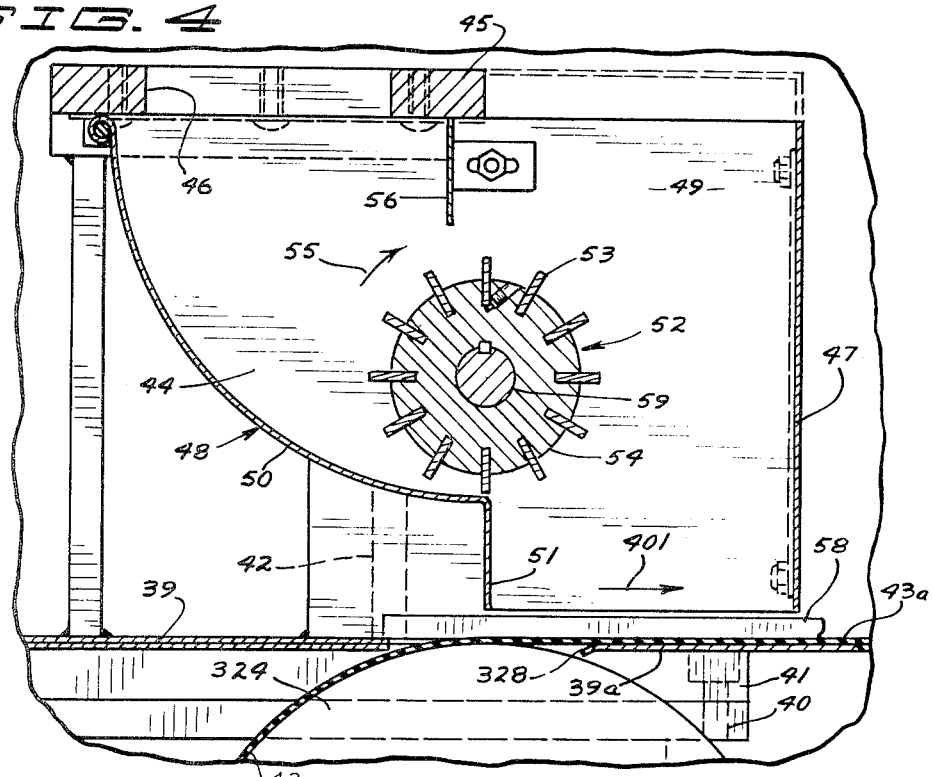
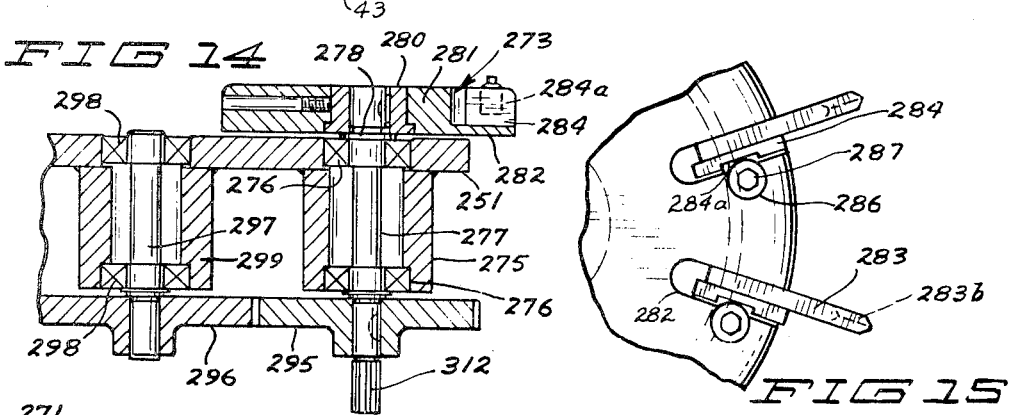
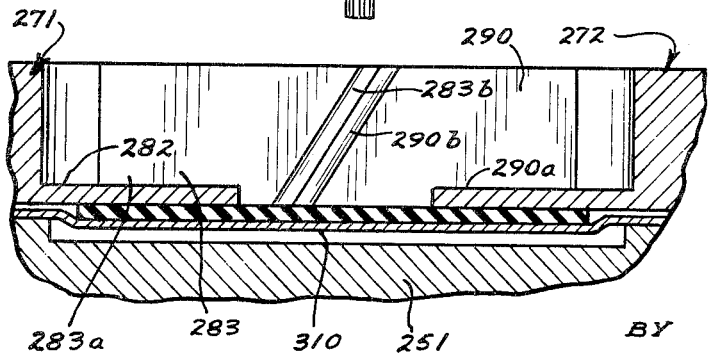

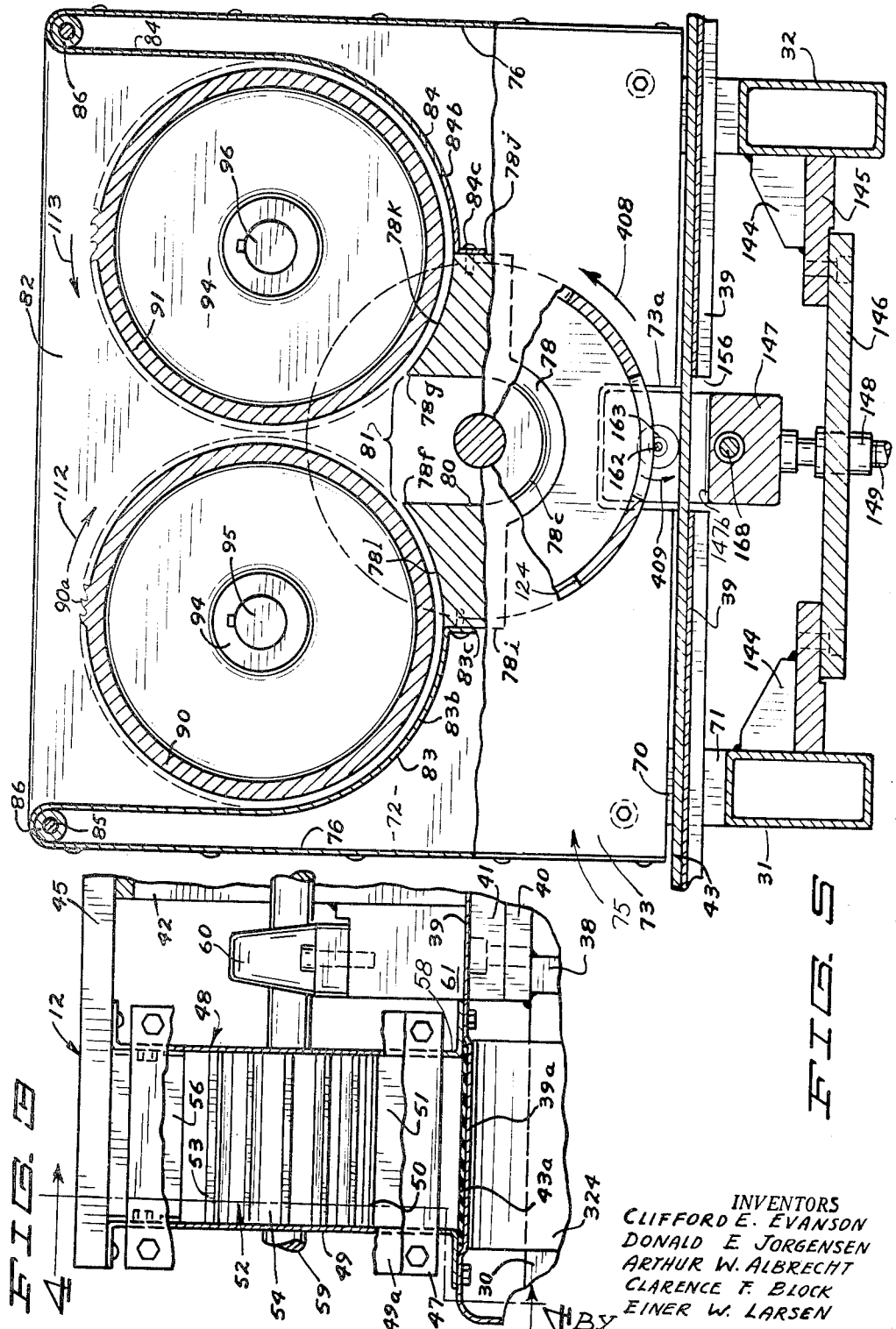

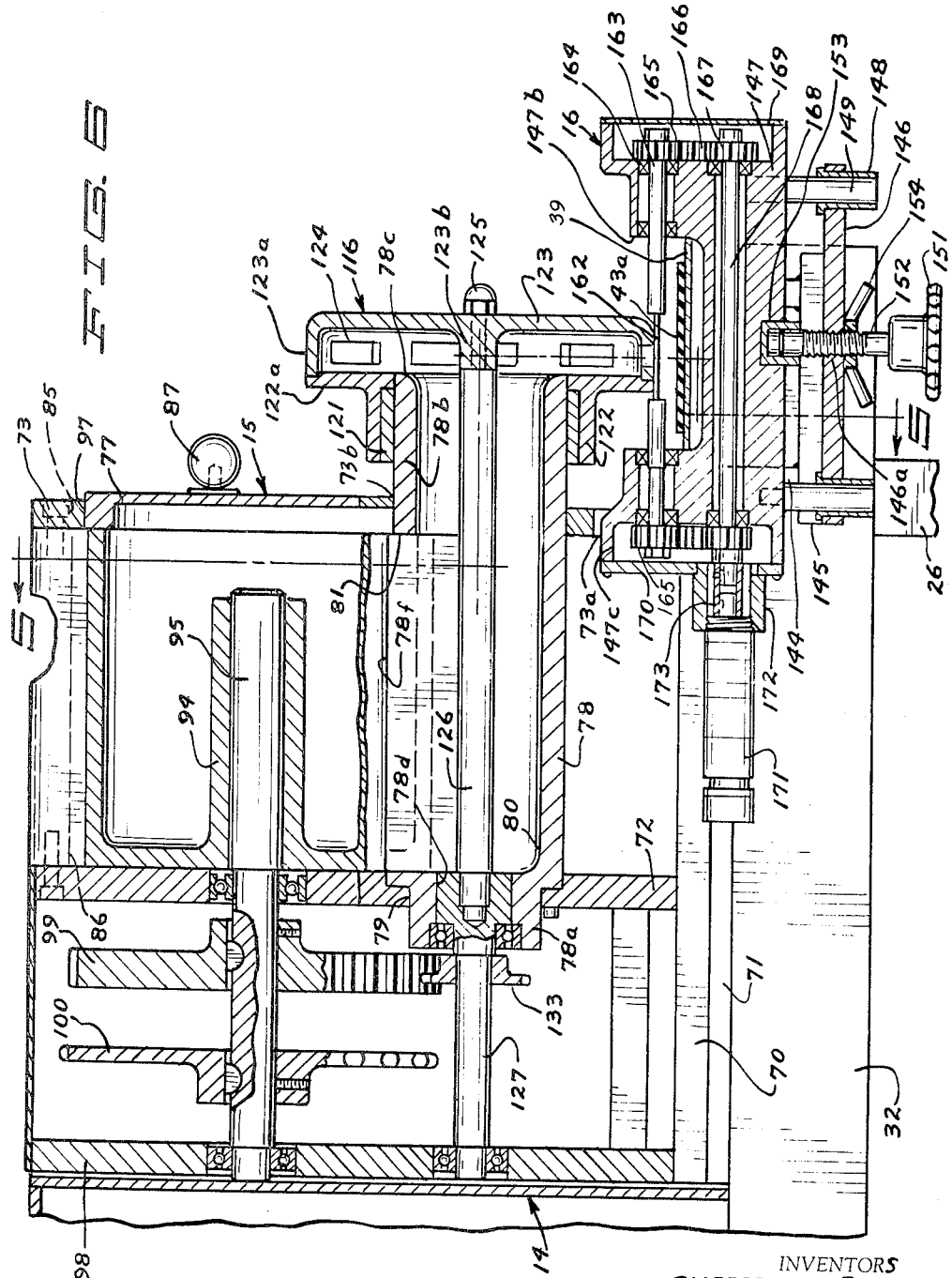

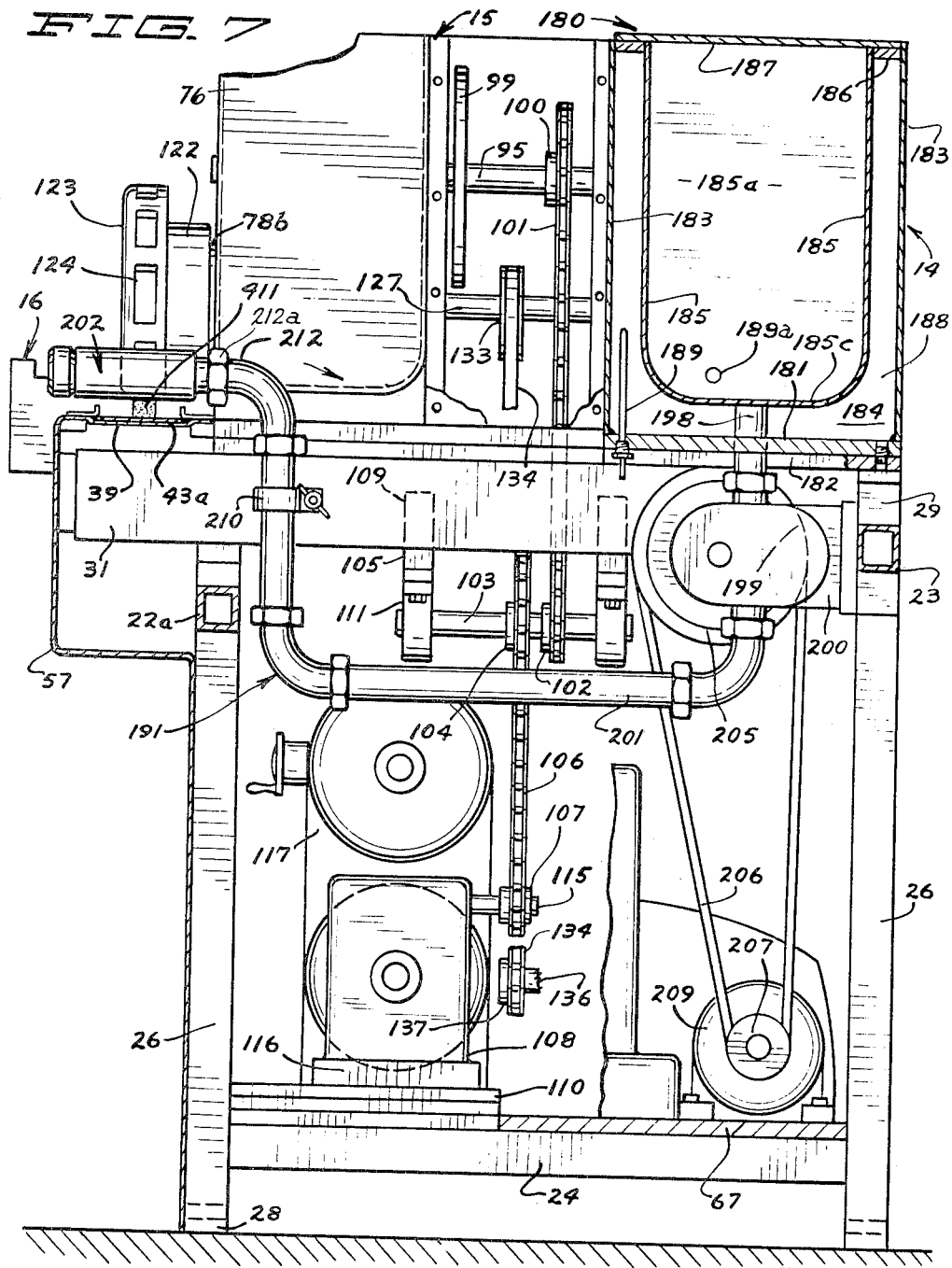

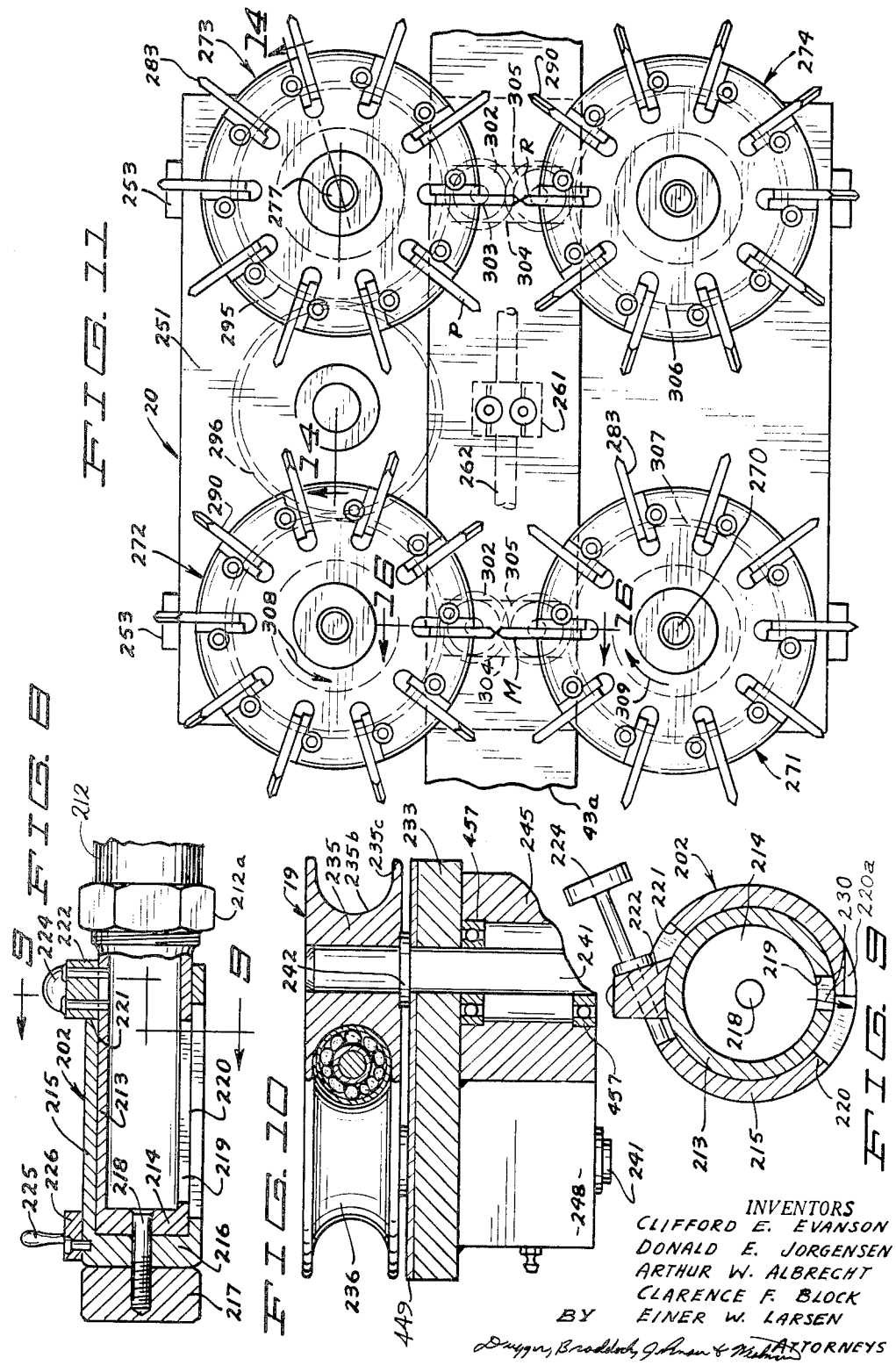

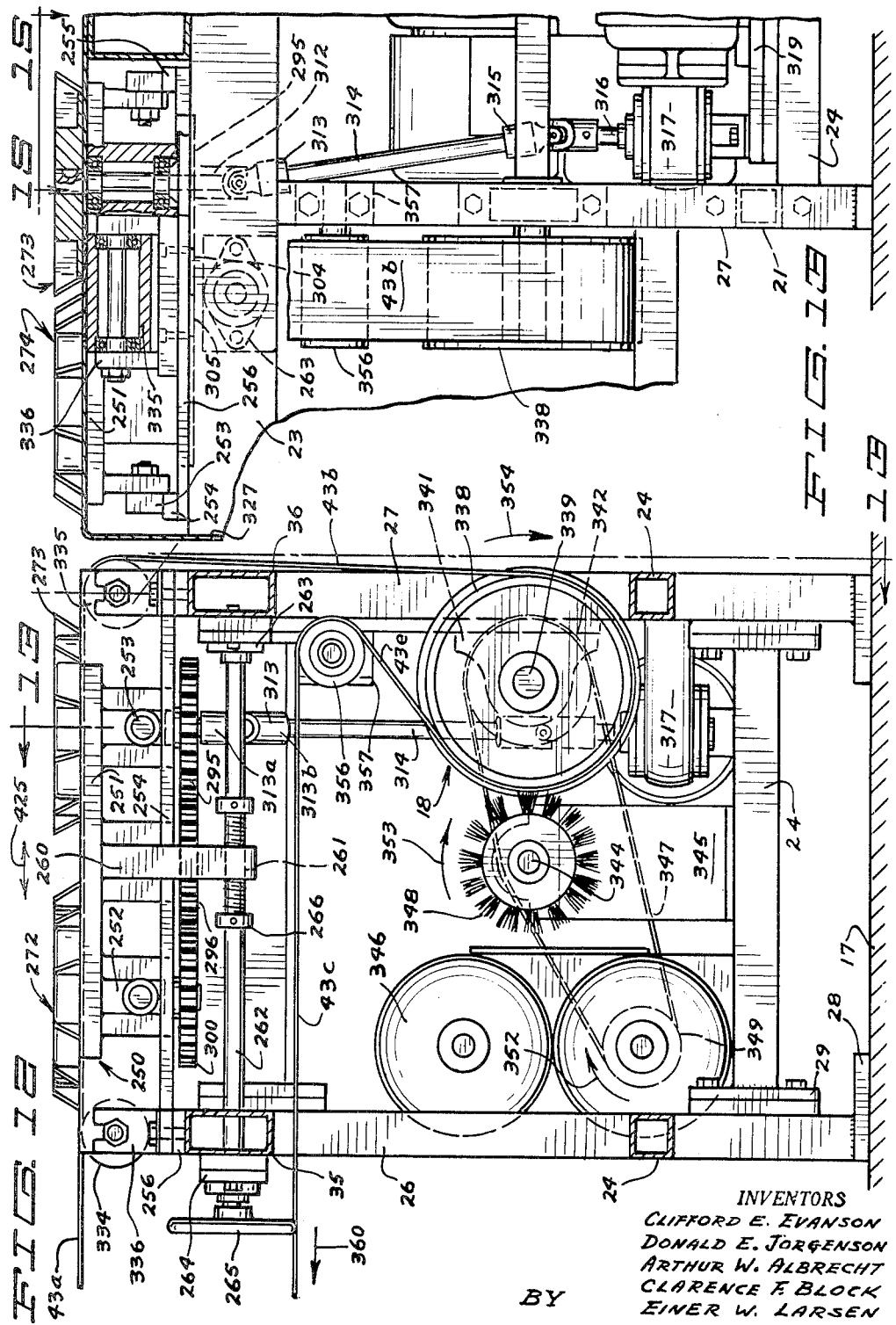

April 12, 1966     C. E. EVANSON ETAL     3,245,360
APPARATUS FOR FORMING A CONFECTIONERY PRODUCT
Original Filed Sept. 22, 1961     11 Sheets-Sheet 9
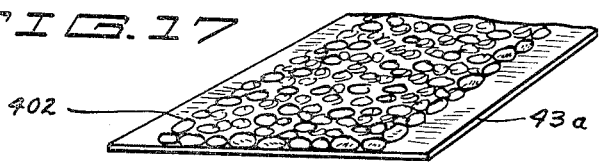
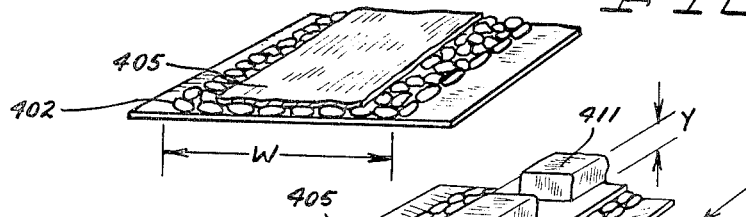
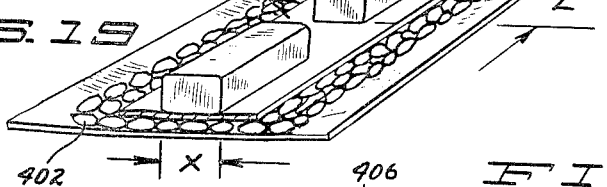
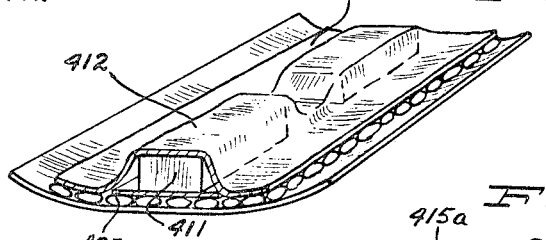
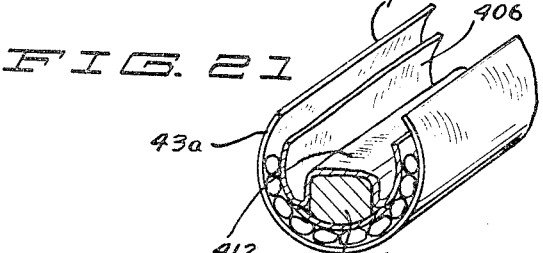
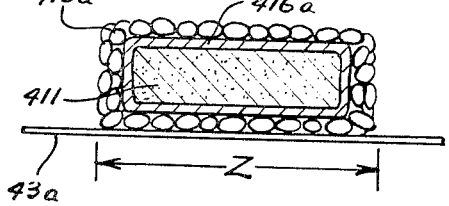
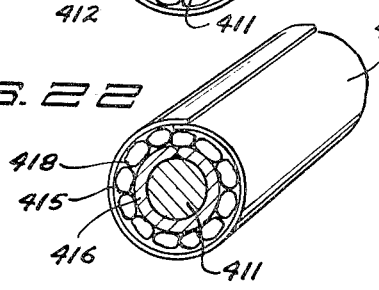
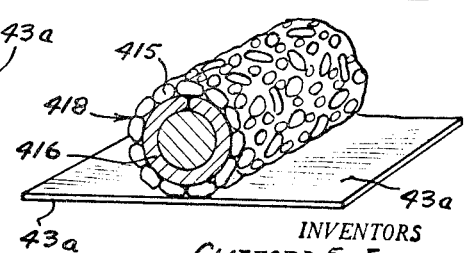
INVENTORS
CLIFFORD E. EVANSON
DONALD E. JORGENSON
ARTHUR W. ALBRECHT
BY    CLARENCE F. BLOCK
EINER W. LARSEN
ATTORNEYS April 12, 1966  C. E. EVANSON ETAL  3,245,360
APPARATUS FOR FORMING A CONFECTIONERY PRODUCT
Original Filed Sept. 22, 1961  11 Sheets-Sheet 10

INVENTORS
CLIFFORD E. EVANSON
DONALD E. JORGENSEN
ARTHUR W. ALBRECHT
CLARENCE F. BLOCK
EINER W. LARSEN
BY
ATTORNEYS

April 12, 1966    C. E. EVANSON ETAL    3,245,360
APPARATUS FOR FORMING A CONFECTIONERY PRODUCT
Original Filed Sept. 22, 1961    11 Sheets-Sheet 11
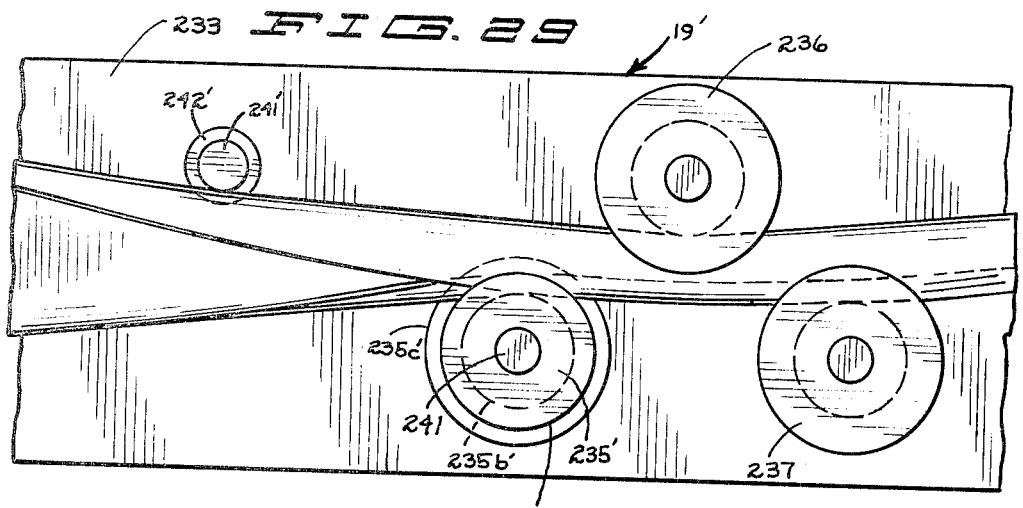
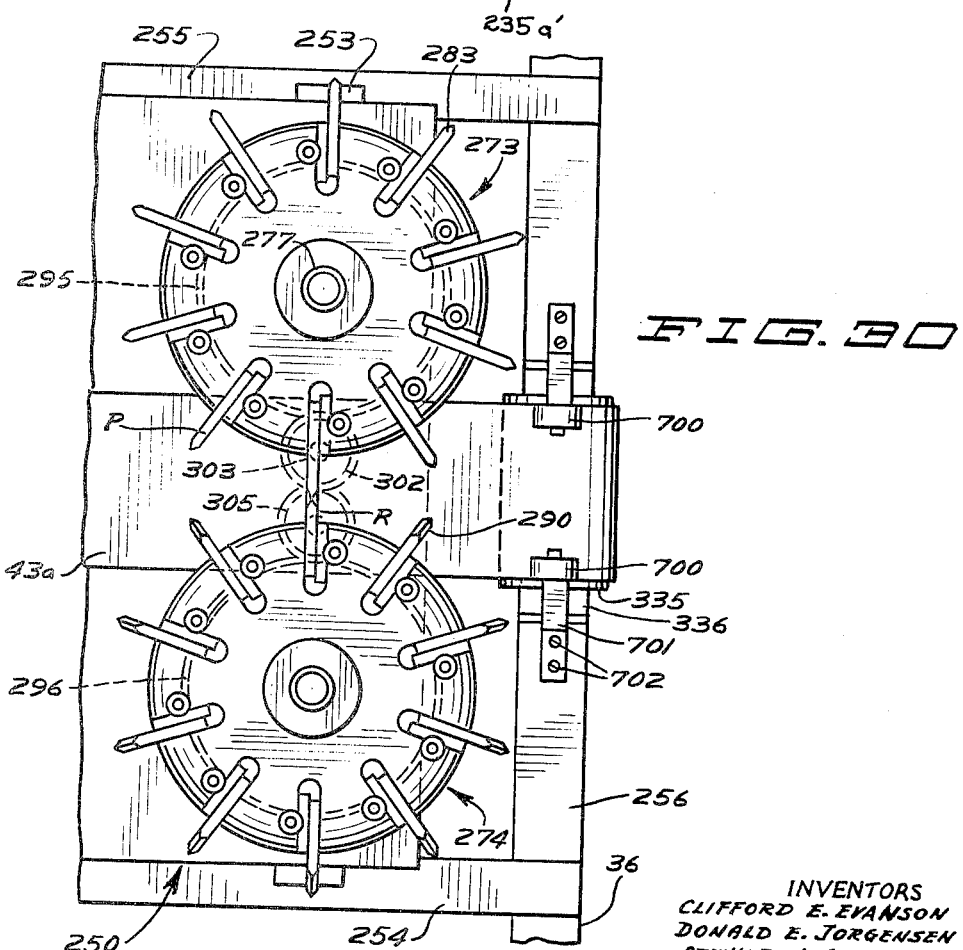
INVENTORS
CLIFFORD E. EVANSON
DONALD E. JORGENSEN
ARTHUR W. ALBRECHT
CLARENCE F. BLOCK
BY EINER W. LARSEN
Dugger Braddock Johnson + Westman
ATTORNEYS

United States Patent Office 3,245,360
Patented Apr. 12, 1966

3,245,360
APPARATUS FOR FORMING A CONFECTIONERY PRODUCT
Clifford E. Evanson, Highland Park, Ill., Donald E. Jorgensen, Minneapolis, and Arthur W. Albrecht, West St. Paul, Minn., and Clarence F. Block, Barrington, and Einer W. Larsen, Palatine, Ill., assignors to Pearson Candy Company, St. Paul, Minn., a corporation of Minnesota
Original application Sept. 22, 1961, Ser. No. 140,028, now Patent No. 3,156,195, dated Nov. 10, 1964. Divided and this application Nov. 29, 1963, Ser. No. 336,329
22 Claims. (Cl. 107—1)

This is a division of application Ser. No. 140,028, filed Sept. 22, 1961 and now Patent No. 3,156,195.

This invention relates to apparatus for carrying out a novel continuous method of forming a nut roll or related products from the "outside-in."

In the prior art machines the method in making candy having a center of one material such as nougat and then a casing layer of second material that may or may not be of materials such as, for example, nuts, first the nougat center piece is cut and then dipped in caramel. The caramel coated nougat is then dipped in nuts. Thus, in the prior art methods, the candy bar (nut roll) was made from the inside-out, which was primarily a manual operation. The aforementioned prior art method does not adapt itself to automation.

An object of this invention is to provide new and novel apparatus for forming a confectionery product wherein first a layer of nuts is provided, then a layer such as caramel is deposited on the nuts, next a nougat center is positioned in the caramel and subsequently the aforementioned material is rolled and cut from a confectionery bar.

A still further object of this invention is to provide a new and novel confectionery making machine for continuously forming a confectionery product having a center piece coated with a first material and then an outer layer of nuts or related material at a substantially higher rate than possible with prior art machines. Another object of this invention is to provide a new and novel extruder assembly for continuously extruding a sticky viscous material such as nougat of a predetermined width and length. Still another object of this invention is to provide for a confectionery machine, a new and novel extruder assembly and cut off assembly that continuously forms a series of center pieces at a given height, width, and length and deposits the center pieces in predetermined spaced relation on a belt as the belts move beneath the extruder wheel of the extruder assembly. Still another object of this invention is to provide a novel spinning wire cut off assembly usable for cutting center pieces from a rotating extruder head that extrudes a shaped material radially outwardly from its circumferential surface.

Another object of this invention is to provide new and novel dispensing apparatus that will continuously deposit a film of sticky viscous material such as caramel and that may be readily adjusted to permit chunks to pass therethrough and again reset to deposit a continuous film.

Still another object of this invention is to provide a new and novel caramel dispenser assembly that may be readily adjusted for depositing a film at a given thickness and easily adjusted to a different setting for depositing a film of a different thickness as a belt continuously moves therebeneath.

Still another object of this invention is to provide a new and novel former roll assembly for continuously rolling a belt as the belt is moved therethrough to roll a confectionery product. Still a further object of this invention is to provide a new and novel bar cut off assembly for cutting a continuously formed run of confectionery product as it is passed therebetween to form confectionery bars. Still another object of this invention is to provide a new and novel rotary cut off wheel to be utilized in cooperation with a second cut off wheel for cutting confectionery material that is passed between the two cooperating wheels.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which the same reference numerals relate to the same parts and in which:

FIGURE 1A and FIGURE 1B fitted together along the line X—X form a plan view of the candy machine of this invention, other than for the caramel tank and the nougat dispenser assembly which are not shown;

FIGURES 2A and 2B fitted together along the line Y—Y form a vertical side elevational view of the candy machine of this invention;

FIGURE 3 is a fragmentary end view of the nut dispenser assembly taken along the line and in the direction of the arrows 3—3 of FIGURE 1A, a portion of the front plate being broken away to more clearly show the nut impeller;

FIGURE 4 is a side cross-sectional view taken along the line and in the direction of the arrows 4—4 of FIGURE 3 to further illustrate the nut dispenser assembly;

FIGURE 5 is a cross-sectional view of the extruder assembly and the cut-off assembly taken along the line and in the direction of the arrows 5—5 of FIGURE 6;

FIGURE 6 is a side elevational view, part in cross-section, of the structure of FIGURE 5, the view being generally taken along the line and in the direction of the arrows 6—6 of FIGURE 2A. The lower portion of the extruder head is broken away and the upper portion is shown in phantom to illustrate its position as if it were not broken away;

FIGURE 7 is a transverse cross-sectional view of the machine of this invention to more clearly show the caramel dispensing assembly, said view being taken along the line and in the direction of the arrow 7—7 of FIGURE 2A;

Figure 25:
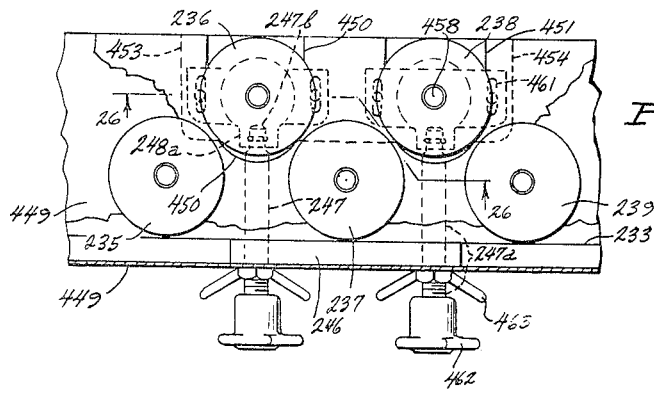
Figure 26:
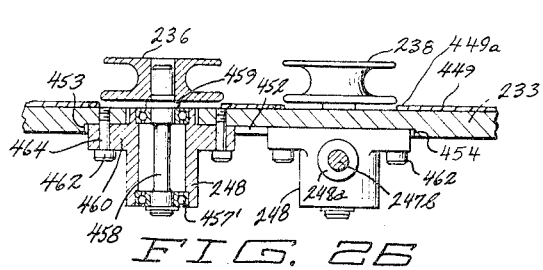
Figure 28:
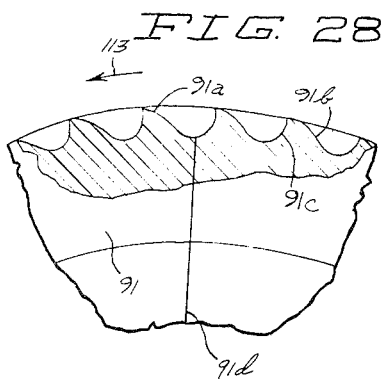
Figure 27:
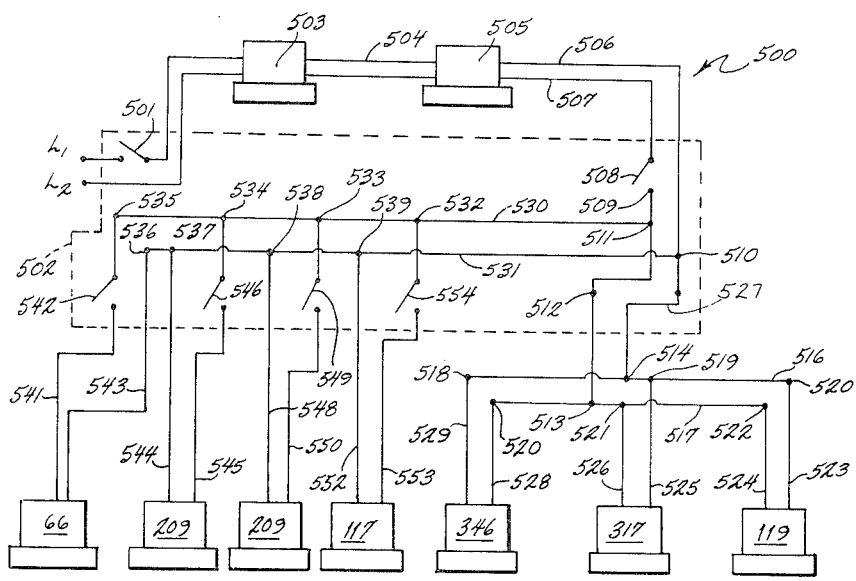

FIGURE 8, for the most part, is a transverse cross-sectional view of the caramel dispensing nozzle taken along the line and in the direction of the arrows 8—8 of FIGURE 2A;

FIGURE 9 is a sectional view taken along the line and in the direction of the arrows 9—9 of FIGURE 8 to show the adjustment and cleaning features of the nozzle;

FIGURE 10 is a transverse sectional view taken along the line and in the direction of the arrows 10—10 of FIGURE 1B to more clearly show the former rolls shaping the belt and the material thereon to fold the nut and caramel around the nougat;

FIGURE 11 is a plan view of the bar cut off assembly taken along the line and in the direction of the arrow 11—11 of FIGURE 2B;

FIGURE 12 is a vertical elevation in cross-section taken along the line and in the direction of the arrow 12—12 of FIGURE 1B to show the bar cut off assembly and drive structure at the front end of the machine;

FIGURE 13 is a transverse cross-sectional view of the apparatus shown in FIGURE 12, said view being taken along the line and in the direction of the arrow 13—13 of FIGURE 12;

FIGURE 14 is a fragmentary cross-sectional view in vertical elevation taken along the lines in a direction of the arrows 14—14 of FIGURE 11 to more clearly illustrate the structure of the cut off wheel and the mounting thereof;

FIGURE 15 is a fragmentary plan view of one of the cut off wheels to more clearly illustrate the mounting of the blades, said view being generally taken along the line in a direction of the arrow 15—15 of FIGURE 13;

FIGURE 16 is a transverse sectional view taken along the line in the direction of the arrows 16—16 of FIGURE 11 to more fully illustrate the mounting of a cooperating pair of blades;

FIGURE 17 is a fragmentary perspective view of the conveyer belt with a layer of nuts thereon as the belt passes over the vibrator, said view being taken at the line and generally in the direction of the arrows 17—17 of FIGURE 1A;

FIGURE 18 is a fragmentary perspective view of the belt together with the layer of nuts and the first caramel layer deposited on said layer of nuts after the belt has passed through the first caramel station, said view being generally taken at the location of the line and in the direction of the arrows 18—18 of FIGURE 1A;

FIGURE 19 is a fragmentary perspective view of a series of spaced nougat centers deposited on the material shown in FIGURE 18, said view being generally taken at the line and in the direction of the arrows 19—19 of FIGURE 1A;

FIGURE 20 is a fragmentary perspective view corresponding to FIGURE 19 other than that the second caramel layer has been deposited on the material shown in FIGURE 19, said view being generally taken at the line and in the direction of the arrows 20—20 of FIGURE 1A;

FIGURE 21 is a fragmentary perspective view of the belt together with the material thereon just prior to entering the former roll assembly, said view being generally taken at the line and in the direction of the arrows 21—21 of FIGURE 1A;

FIGURE 22 is a fragmentary perspective view of the belt in a rolled condition together with the material contained therein as it passes between the former rolls at the line and generally in the direction of the arrows 22—22 of FIGURE 1B;

FIGURE 23 is a fragmentary perspective view in transverse cross-section of the cylindrical roll of material after the belt has unfolded, said view being taken at the line and generally in the direction of the arrows 23—23 of FIGURE 1B;

FIGURE 24 is a longitudinal, vertical, cross-sectional view of the candy bar that is formed, said view being taken in advance of the cut-off wheels;

FIGURE 25 is a fragmentary plan view of the roll former assembly generally taken along the line and in the direction of the arrows 25—25 of FIGURE 2B;

FIGURE 26 is a cross-section view taken along the line and in the direction of the arrows 26—26 of FIGURE 25 to more clearly illustrate the structure for adjustably positioning one of the former rolls;

FIGURE 27 is a schematic diagram of the power circuits of this invention;

FIGURE 28 is an enlarged fragmentary cross-sectional view of the grooved portion of the right hand drum of FIGURE 5;

FIGURE 29 is an enlarged fragmentary plan view of a modified embodiment of the roll former assembly; and FIGURE 30 is an enlarged fragmentary plan view of a modified embodiment of a bar cut off assembly having only two cut off wheels and the structure adjacent thereto at the front end of the machine.

Referring now in particular to FIGURES 1A, 1B, 2A, and 2B, there are illustrated, a side elevational view and major portion of a plan view of the confectionery machine, generally designated 10 of this invention, it being mentioned that the caramel tank, the extruder assembly and cut-off assembly are not shown in FIGURE 1A nor do these figures illustrate panels of the machine. The machine 10 includes a main frame 11 having a nut dispenser assembly 12 mounted on the rear end thereof, a caramel dispenser assembly 14 located forwardly of the nut dispenser assembly, an extruder assembly 15 located adjacent the caramel dispenser assembly, a cut-off assembly 16 located adjacent the extruder assembly, a vibrator 13 located intermediate the extruder assembly and nut dispenser assembly, a bar cut-off assembly 20 located at the front end of the machine, a former roll assembly 19 located intermediate the bar cut-off assembly and extruder assembly, and a conveyor assembly 18 for conveying the materials forming the confectionery product as the materials are deposited on the belt and advanced from the rear end of the machine to the forward end thereof.

MAIN FRAME

The main frame 11 includes a pair of transversely spaced rear end uprights 25, a plurality of intermediate uprights 26, and a pair of transversely spaced front uprights 27. The uprights are appropriately secured to the base members 28 which in turn are mounted on the floor 17. Located intermediate each adjacent pair of longitudinally spaced uprights, secured at either end to the respective uprights by mounting brackets 29, and extending longitudinally on either side of the frame is a plurality of lower longitudinal frame members 21.

On the back side of the machine and connected at either end to the adjacent upright by appropriate mounting brackets 29 are a plurality of upper longitudinal frame members 23. On the front side of the machine and connected at either end to the respective adjacent upright by mounting brackets are the upper longitudinal frame members 22a, 22b, 22c, 22d, 22e, and 22f respectively.

Each set of transversely spaced uprights at their lower ends are connected by lower cross braces 24, there being provided mounting brackets 29 for forming the connections. The upper ends of each pair of vertical uprights are interconnected by appropriate cross braces, the rear end uprights being connected by the cross brace 30 and the front end uprights being connected by the cross brace 36. Intermediate the cross braces 30 and 36 and connected to the respective pair of uprights are cross braces 31, 32, 33, 34 and 35. Appropriate panels (not shown) are secured to the aforementioned frame members for enclosing the frame.

NUT DISPENSER ASSEMBLY

Bolted to the cross brace 30 and welded to the pair of angle brackets 38 (only one being partially shown) are a pair of vertically stacked horizontal mounting plates 40 and 41 (see FIGURES 1A, 1B, 3 and 4). The brackets 38 are welded to the brace 30 to extend forwardly thereof. The legs of a generally U-shaped bracket 42 are welded to the front plate 41 to extend upwardly therefrom. Welded to the web portion of the bracket 42 to extend transversely therefrom in position to overhang the conveyor belt 43 is the dispenser housing mounting plate 45. The mounting of the conveyor belt will be described hereinafter.

Bolted to the outer transverse portion of the mounting plate to depend therefrom is a dispenser housing 48. The impeller, generally designated 52, is rotatably mounted in the housing 48. The impeller has a plurality of spaced radially extending impeller blades 53 mounted on the drum 54 thereof.

The dispenser housing 48 includes a pair of transversely spaced side walls 49, the back edge portions of the side walls being shaped to extend coextensive with the curved bottom wall 50. The front edge of the bottom wall ends directly beneath a blade 53 in a vertical position. A vertical bottom wall extension 51 depends from the front edge of the bottom wall to a position closely adjacent the upper run 43a of belt 43.

The side walls 49 extend a substantial distance forwardly of the impeller and in overhanging relation relative to the conveyer belt to preclude the nuts being dispensed from falling off the edges of the belt. The forward end portions of the side walls are outwardly flanged at 49a to have the front plate 47 bolted thereto, the lower edge of the front plate being sufficiently spaced above the upper run of the belt for a layer of nuts to pass therebeneath.

Bolted to the side walls 49 directly beneath the mounting plate 45 is a vertical plate 56, the lower edge of the vertical plate located above and rearwardly of the uppermost portion of the impeller to preclude the nuts in the dispenser housing falling over the propeller blades in a direction opposite of the direction of rotation of the impeller. The impeller is rotated in the direction of arrow 55, the speed of rotation and the radial extent of the blades outwardly from the drum 54 controlling the rate of discharge of nuts from the dispenser housing.

To permit filling the nut chamber 44 enclosed by the housing and plate 45, the mounting plate is provided with an inlet aperture 46. Preferably the lower end of a conduit (not shown) is secured to the mounting plate to continuously fill the dispenser chamber through the aperture 46. The upper end of the conduit is connected to an appropriate hopper (not shown).

The impeller 52 is keyed to one end of the impeller shaft 59 which is extended through appropriate apertures formed in the walls 49, and an intermediate portion of the shaft 59 is journaled in the bearing mount 60, which is bolted to the mounting block 61. The block 61 is welded to the upper mounting plate 41 to extend upwardly therefrom. The other end of the impeller shaft is journaled for rotation in a bearing member located in the pillow block 62, said pillow block being welded to an upper longitudinal frame member 23 to extend upwardly therefrom. Mounted on the shaft 59 adjacent the pillow block is a pulley 63, there being a drive belt 64 extended around the pulley 63 and the drive sheave of the variable speed motor 66 for driving the impeller shaft. The motor is mounted on the motor mounting plate 67 which is secured to the lower cross braces 24 located beneath the upper cross braces 30, 31, 32, and 33.

EXTRUDER ASSEMBLY

The structure of the dispenser assembly having been described, the structure of the extruder assembly will now be set forth. The extruder assembly, generally designated 15, is secured to a pair of parallel mounting bars 70 to extend upwardly therefrom, each mounting bar 70 being secured to a lower mounting bar 71 (see FIGURES 2A, 5 and 6). One mounting bar 71 is welded to the upper cross brace 31 and the other mounting bar 71 being welded to the cross brace 32.

The extruder assembly includes an extruder housing 75 having a vertical back side wall 72 and a front side wall 73, the walls being secured to the bars 70 by conventional means such as cap screws. The bottom member 78 of the extruder housing at the back portion 78a is extended through an opening 79 formed in the back wall to form a sealing fit with said back wall. The other transverse end portion 78b of the bottom member is tubular in shape and extends outwardly through the aperture 73b formed in the front side wall 73 a sufficient distance to have the outlet 78c located directly above the transverse center portion of belt 43. The bottom member has a chamber 80 that is enclosed other than for the outlet port 78c, the opening 78d in back portion 78a and the inlet port 81. The inlet port is bounded at transverse sides by walls 72 and 73 respectively, and the edges 78f and 78g.

Extending between walls 72, 73 is a curved extruder housing end wall 83. The upper edge of the wall 83 is bent around the rod 86 which at either end is secured to the respective wall 72 and 73 by a cap screw 85. The wall 83 extends vertically downwardly from the rod 86 and has a lower generally arcuate portion 83b that ends in a vertical flange 83c. The flange 83c is bolted to the vertical edge 78i of the bottom member 78. The front extruder housing end wall 84 is of the same shape as wall 83 but is mounted to be oppositely faced.

The flange 84c is secured to the vertical edge portion 78j of member 78 by cap screws while the upper edge portion is bent around a rod 86. The upper surface 78l of the bottom is shaped to have nearly the same curvature as the portion 83b to form a continuation thereof while the surface 78k is shaped to nearly form a continuation of the curvature of the arcuate portion 84b of the wall 84.

The main chamber 82 of the extruder housing which is enclosed by the walls 72, 73, 83, 84 and the bottom member 78 other than for the chamber 80 has a pair of grooved drums, 90 and 91, located therein for forcing the contents within the chamber 82 through the opening under 81 pressure into the chamber 80. Each of the drums 90 and 91 are the same shape and size, the diameter of the drum 90 being such that the outer periphery of the grooved portions 90a thereof form a close fit with the curved surface of 78l while the outer periphery of the grooved portions 91a of the drum 91 form a close fit with the curved surface of 78k.

The surfaces 78l and 78k form a close clearance fit with the respective drum whereby the edges 78f and 78g for the drums 90 and 91, respectively, act as scrapers to prevent the nougat, other than in the grooves, from going around with the drums but rather force it down into the chamber 80 as the drums are rotated. The wall portions 83b and 84b have a slightly greater radius of curvature than surfaces 78l and 78k such that said wall portions are spaced, for example, a ¼" from the adjacent outer peripheral portions of the respective drums.

The drums are mounted to have the adjacent outer peripheral portions of the grooves sufficiently closely adjacent one another so that the nougat (or similar material) present in the chamber 82 will be forced downwardly therebetween under the desired pressure. It is to be noted that the projections forming the grooves are oppositely inclined and that the grooves are somewhat cupped shape. As may be noted in FIGURE 28 for the grooved portion of drum 91, the surface 91b generally forms a larger acute angle with the radial plane 91d through the trough of the groove and the axis of rotation of the drum than the angle between the surface 91c and the same plane. The corresponding surfaces of the drum 90 are oppositely faced. As a result of shaping and offsetting the grooves in the aforementioned manner, a better bite into the nougat is obtained. Although, it is preferred, that the grooves be shaped as described since the nougat is more positively forced in a downward direction (between the drums), it is understood if the positions of the drums are interchanged or if the grooves are a different shape, the drums will still be operable for forcing nougat under pressure into chamber 80.

A circular closure 77 is positioned in each aperture 97 formed in wall 73 in sealing engagement therewith and sealing engagement with the adjacent axial end of the respective drum. There is provided conventional means such as bolts 87 extended through tabs on the closures for removably securing them to the wall 73, to facilitate removal of the drums which may be removed through the respective aperture 97.

Each of the drums include a hub portion 94 that is keyed to the respective shafts 95 and 96. The shafts 95 and 96 extend outwardly through appropriate bearings in the wall 72 and have the opposite ends thereof mounted in bearings in a vertical plate 98, which is secured to the mounting bars 70 by cap screws to be parallel to and spaced from the wall 72. Transversely extending end panels 76 are secured to vertical edges of walls 72, 73 and plate 98.

On each of the shafts 95 and 96 is a spur gear 99 that intermeshes with the gear on the other shaft. The shaft 95 is driven by the chain sprocket 100 mounted thereon, the shaft 96 being driven through the intermeshing relationship of the gears 99. A chain 101 is extended around the chain sprocket 100 and the chain sprocket 102 which is keyed on the intermediate shaft 103 (see FIGURES 6, 7, and 2A). The shaft 103 at either end is journaled in a bearing member 111 bolted to a brace 105, braces 105 at one end being welded to brace 31 and at the opposite end to brace 32. To drive the shaft 103 there is keyed thereto a chain sprocket 104. A chain 106 is extended around the chain sprocket 104 and the drive chain sprocket 107 which is keyed to the output shaft 115 of the reducer 108. The reducer is bolted to the plate 116 that is secured to the mounting plates 110 which in turn are mounted on the lower cross braces located directly beneath cross braces 31 and 32 respectively. The drive shaft of the reducer is connected through coupling 118 to a drive shaft of the variable speed motor 117 mounted on plates 110.

Through the aforementioned drive structure and due to the intermeshing relationship of gears 99, the drum 90 is driven in the direction of arrow 112 while the drum 91 is driven in the direction of arrow 113. The rotation of the drum forces the material in chamber 82 through the opening 81 into the chamber 80 and then through the outlet 78c under a constant pressure.

In order to form center pieces of confectionery material of desired width and length, an extruder head 116 is mouned on the annular portion 78b of the bottom number 78. The extruder head 116 includes a seal ring 121 retained intermediate the hub portion 122 and the bottom portion 78b. The hub has a radially extending annular flange 122a that is secured to the edge of annular portion 123a of the extruder cap 123 in sealing engagement therewith by appropriate means such as cap screws. Formed in the annular portions of the cap 123 are a plurality of circumferentially spaced apertures 124, each aperture being of the same width and length as the nougat center piece of the candy bar made by the machine of this invention.

The extruder cap has an axially extending off-set 123b through which the cap screw 125 extends for securing the cap to one end of the extruder shaft 126 to rotate therewith. The extruder shaft extends through the chamber 80 and at the opposite end is mounted in the enlarged diametric portion of the shaft 127. The enlarged diametric portion is located in the aperture 78d to form a sealing fit with the bottom portion 78a. The opposite end of the shaft 127 is journaled for rotation in the vertical plate 98.

The chain 134 is extended around a chain sprocket 133 mounted on the shaft 127 and the drive chain sprocket 137 mounted on the motor shaft 136 of the gear motor 135 which is mounted on the plate 67.

NOUGAT CUT OFF ASSEMBLY

The structure of the extruder assembly having been described, the structure of the nougat cut off assembly 16 will now bet set forth. The nougat cut off assembly includes a cut off block 147 that extends upwardly through the aperture 156 formed in the panel 39. A pair of transversely spaced guide rods 149 are secured to the guide block to depend therefrom. The guide rods are extended through guide tubes 148 for vertical movement therein, said tubes being retained in appropriate apertures formed at opposite transverse sides of the mounting plate 146. A mounting bar 145 is bolted to either end of the mounting plate 146. One of the mounting bars is welded to the pair of transversely spaced angle brackets 144, which in turn are welded to a cross brace 31 while the other mounting bar is welded to the pair of spaced angle brackets that are welded to the cross brace 32.

In order to vertically adjust the elevation of the cut off block and retain it in the adjusted position, a bearing 153 is mounted in the central portion of the cut off block to depend therefrom. The bearing rotatably mounts the upper end of the threaded rod 152 and at the same time prevents vertical movement of the rod relative to the cut off block. The threaded portion of rod 152 extends through the threaded aperture 146a of the plate 146 and has mounted on the lower end thereof a handle 151 for turning rod 152 to vary the elevation of the cut off block. A lock nut 154 is threaded on the rod 152 to retain the rod in a vertically adjusted position, it being noted that the rod 152 is parallel to and intermediate guide rods 149. By turning the handle 151, the elevation of the spinning wire 162 may be adjusted to position it in close proximity to the head 116 and permit lowering the cut off block for disassembly purposes.

The cut off block has a recessed portion 147b through which the upper run of the belt 43 is extended. As may be noted in FIGURES 5 and 6, the panel 39 supports the belt so that it is spaced above the bottom of the recess 147b.

Located beneath the extruder head within close proximity of the lowermost circumferential portion thereof is a spinning wire 162 secured for rotation about an axis parallel to the rotary axis of the extruder shaft 126. Either end of the wire is secured in one end of a cylindrical retainer 163. Each of the cylindrical retainers is mounted for rotation in a pair of spaced bearings 164 which are located in appropriate bores formed in upwardly extending portions of the cut off block. The opposite end portions of the cylindrical retainers extend into recesses 147c formed at either end of the cut off block. Keyed on the opposite end of each retainer and located within the respective recess is a drive gear 165, the drive gear being in intermeshing relationship with an intermediate gear 166 on the cut off block. The intermediate gear in turn is mounted in intermeshing relationship with a drive gear 167 keyed on the drive shaft 168, the drive shaft being extended through a bore formed in the cut off block and journaled for rotation in bearings mounted in said bore. As shown in FIGURE 6, each gear 165, 166, 167 is located within the respective recess 147c. The front recess 147c is covered by a closure plate 169 bolted to the cut off block while the other recess is covered by a closure plate 170.

An annular motor mount 172 is secured to closure plate 170 to have one end of the drive shaft 168 extend thereinto, said one end of the drive shaft being connected by a coupling 173 to a conventional type motor shaft of the air motor 171. The air motor is mounted on a closure plate 170 by the annular motor mount 172, it being noted that the portion of the cut off block on which the air motor is mounted is extended through aperture 73a formed in a lower end of the front wall 73. The gears 166 may be eliminated by the use of timing chains for drivingly connecting gears 165 to gears 167 and having the air motor drive the shaft 168 in the opposite direction.

CARAMEL DISPENSING ASSEMBLY

The cut off assembly having been described, the structure of the caramel dispensing assembly 14 will now be set forth. The caramel dispensing assembly includes a tank, generally designated 180, having a tank housing made up of a bottom plate 181, a pair of end walls 184, a pair of side walls 183, and a cover 187 removably secured to said walls (see in particular FIGURES 6 and 7). The bottom wall is secured to a pair of spaced mounting bars 182, one of said mounting bars being welded to the cross brace 31 and the other to the cross brace 32.

As may be observed from FIGURE 2A, the longitudinal length of the side walls 183 and bottom wall is greater than the corresponding lengths of the vertical plate 98 and the extruder assembly, the walls 181 and 183 extending a substantial distance outwardly beyond either edge of the plate 98. The tank is positioned on the frame so that one of the side walls 183 is closely adjacent the plate 98 (see FIGURES 6 and 7).

A container mounting bar 186 extends along the upper edge of each of the side walls 183 for suspending the caramel container 185 within the tank housing so that it is spaced at either transverse side from the adjacent side wall and above the bottom plate 181. By mounting the caramel container in this manner, there is provided an enclosed heating chamber 188, it being mentioned that the container extends nearly the longitudinal length of the tank housing and has end walls located adjacent but in spaced relation to the end walls 184 of the tank housing. A plurality of Chromalox heater elements 189 of an electrical type are extended upwardly through appropriate apertures formed in the bottom plate 181 to extend into the chamber 188 for heating the caramel which is in the container 185. A thermometer 189a is extended through one of the end walls in the tank housing and the container end wall 185a to measure the temperature of the caramel. A thermostat (not shown) may be mounted on the bottom plate to extend in the heating chamber 188.

First caramel conveying means 191 that are described hereinafter are provided for conducting caramel from the caramel container to discharge caramel on the material contained on the upper run 43a at the first caramel station E, station E being located intermediate the nut dispenser 12 and the cut off assembly 16. It is to be noted that the vibrator 13, which is of a conventional type, is located beneath the upper run 43a and longitudinally intermediate the caramel station E and the nut dispenser assembly, the vibrator being mounted on the central portion of the cross brace 190 which at one end is mounted to the end upright 25 and at the outer end of the adjacent upright 26. Second caramel conveying means 192 are provided for conveying caramel from the caramel container to a position to be discharged on the upper run 43a at the caramel station F. The caramel station F is located longitudinally forwardly of the front end of the extruder assembly 15.

Since the means for conveying the caramel from the container to stations E and F respectively are identical other than for the slots that control the transverse width of the strips of caramel deposited on the belt, only the means for conducting the caramel to station E will be described in detail.

The first caramel conveying means 191 includes a connecting line 198 extending upwardly through an appropriate aperture formed in the bottom plate 181 and opening through the aperture (not shown) formed in the bottom wall 185c of the container 185. The opposite end of the line 198 is connected to the inlet of the pump 199, the pump 199 being secured to the upper longitudinal frame member 23 by mounting brackets 200. The pump of the means 191 is located beneath and adjacent one end of the caramel tank while the pump of the second conveying means 192 is located beneath and adjacent the opposite end of the caramel tank. A suitable type pump is that sold under the trademark "Waukesha Pump No. 10."

The pump of the first caramel conveying means is driven by a pulley 205 mounted on the pump drive shaft, there being a belt 206 extended around pulley 205 and the drive pulley 207 of the variable speed motor 209. The motor 209 is bolted to the plate 67.

The line 201 at one end is connected to the discharge outlet of the pump, then extends downwardly, next it extends horizontally in a transverse direction, then upwardly in a vertical direction and finally horizontally where at opposite end it is connected to the caramel discharge nozzle 202 which is located above the upper run 43a. The line 201 is made up of a plurality of lengths of pipe, couplings and elbows connected to extend in a manner illustrated in FIGURE 7. Appropriate means such as brackets 210 connected to the adjacent frame members are provided for securing the line 201 in the desired postion.

The caramel discharge nozzle 202 is connected to the elbow 212 which constitutes the discharge end of the line 201 and has the threaded end of the inner sleeve 213 connected to the elbow by means such as nut 212a. The inner sleeve at the opposite end has an end wall 214 formed integrally therewith. Mounted on the inner sleeve for limited rotational movement relative thereto and form a close fit therewith is an outer sleeve 215, said outer sleeve at one end having an integrally formed end wall 216 abutting against the end wall 214. A stud 218, threaded at one end is journaled for rotation in the end wall 214, said stud extending through appropriate apertures in wall 214 and 216, and being threaded in the lock handle member 217 for retaining said handle member in locking engagement with the end wall 216. By turning the handle 217 in one direction to loosen it, the outer sleeve may be freely rotated relative the inner sleeve; while upon tightening it, the outer sleeve is "locked" in a given angular position relative the inner sleeve.

The inner sleeve has elongated rectangular shaped slot 219 formed therein to extend nearly the axial length thereof and of a length less than the transverse width of the belt. Likewise the outer sleeve has a rectangular slot 220 of a greater axial length than the slot 219 and a circumferential width of the same dimension as that of the slot 219. The slot 220 is cut away at 220a along the axial length thereof to facilitate cleaning the slot and minimize any tendency for caramel to build up at the edge of the slot. By rotating the sleeves relative to one another, the effective dispensing width of the opening through the slots 219, 220 (indicated at arrow 230) may be controlled to thereby control the rate of discharge of caramel through the nozzle. By controlling the rate of discharge, the thickness of the layer of the caramel deposited on the layer of material on the upper run of the belt may be controlled.

In order to retain the sleeves in a given adjusted position, there is provided a narrow circumferentially extending slot 221 in the outer sleeve to have the mount 222 located therein, the mount being secured to the inner sleeve by screws. An adjusting screw 224 is threaded through the mount to bear against one end of the slot wall of slot 221, there being a lock nut provided for retaining the adjusting screw in an adjusted position. By turning the handle 217 and the screw 224, the outer sleeve may be rotated relative to the inner sleeve to increase the effecting opening through the slots 219, 220. Once the effective opening has been set in a desired position, the handle 217 is again tightened to prevent the sleeves rotating to one another. The screw 224 in a set position prevents the outer sleeve being rotated relative to the inner sleeve to decrease the desired opening.

An indicator (not shown) may be mounted on the mount 222 and the cap of screw 224 provided with a scale to indicate the various degrees of rotation thereof to facilitate adjusting the effective width of the opening through slots 219, 220. Also handles 225 mounted on a handle bracket 226 which are secured to the outer sleeve are provided so that the nozzle may be readily cleaned and at the same time after being cleaned again reset to the desired position.

ROLL FORMER ASSEMBLY

The structure of the caramel dispensing assembly having been described, the structure of the roll former assembly 19 will now be set forth. Referring now in particular to FIGURES 1B, 2B, and FIGURE 10, the former roll assembly includes an elongated plate 233 that at either end is secured to a bar 233a by conventional means, the panel 39 being intermediate the plate and the bars. One of the bars 233a is welded to the end portions of the cross brace 33 and the other bar is welded to the end portion of the cross brace 34. A plurality of annular bearing retainer members 245 are mounted on the mounting plate in depending relationship to act in conjunction with the elongated plate to rotatably support the staggered rolls 234, 235, 236, 237, 238 and 239. Each of the rolls 234, 235, 237 and 239 is mounted on the upper end of a stud shaft 241 which extends upwardly above the plate, each shaft having an upper bearing 457 and lower bearing 457 thereon that is located in an appropriate bore formed in the bearing retainer 245.

A vertical plate 246 is secured to the front edge of the mounting plate 233 to extend a substantial distance therebeneath. A pair of longitudinally spaced rods 247, each having a central threaded portion 247a, are extended through the longitudinally spaced apertures in the plate 246, said apertures being threaded to match the threaded portions 247a. The reduced diameter inner end portion 247b of each rod is journaled for free rotation in an offset 248a of a retainer 248 for each of the rolls 236 and 238 respectively, it being noted that the mounting of said inner end portions being such that any transverse movement of the rod will cause the respective retainer 248 to move the same amount. The retainers for rolls 236 and 238 extend upwardly through the cut outs 450 and 451 respectively formed in the mounting plate to the same elevation as the top of the mounting plate. Also appropriate cut outs 449a are found in the panel 449 that is secured to and overlies the mounting plate, said cut outs in shape corresponding to cut outs 450 and 451. The under side of the mounting plate intermediate the cut outs is recessed at 452 and at the opposite side of cut out 450 is recessed at 453 and the opposite of cut out 451 is recessed at 454.

Since the structure of each retainer 248 and for mounting the rolls 236 and 238 in the respective retainer is the same, only the mounting of roll 236 and its retainer will be described hereinafter. The retainer 248 mounts an upper bearing and a lower bearing 457', stud shaft 458 being journaled in said bearings. The roll 236 is mounted on the upper end of the shaft 458, there being a spacer 459 on the shaft intermediate the upper bearing and the roll.

An ear 460 is formed on either side thereof to extend longitudinally outwardly therefrom. In each ear there is provided an elongated, transverse slot 461 through which a cap screw 462 is extended to secure the retainer to the underside of the mounting plate and permit transverse adjustment of the retainer. One ear extends into recess 453 and the other into recess 452.

On the outer end of each rod there is provided a handle 462 for turning the rod and a lock nut 463 on the threaded portion for securing the rod in an adjusted position. Thus, by loosening the lock nut and turning the handle, the rod will move in a transverse direction (due to the matching threads of portions 247a and the threaded apertures in the vertical plate) and thereby move the retainer to which the rod is secured and its roll in a transverse direction.

The rolls 236 and 238 are mounted for transverse adjustment so that if it is desired to use a larger quantity of material for the same length of bar, the rolls 236 and 238 may be transversely spaced a greater distance from rolls 235, 237 and 239. Otherwise, the nougat may be and caramel would be forced into the nut layer to a greater extent than desired.

It is to be mentioned that only the shaft of roll 234 may be provided to initiate the upward bending of the belt. In such a case it is desirable that the upper flanged portion of roll 235 be of a diameter substantially greater than the minimum diameter of the central portion 235b, but of a substantially smaller diameter than the lower flange 235c. The aforementioned modification of the roll former assembly, generally designated 19', is illustrated in FIGURE 29 which shows a vertical stud 241' having an intermediate annular flange 242' mounted on the elongated plate 233 with said flange and the upper end of said stud extending above said plate. As may be noted the stud 241' has no roll mounted thereon but rather bears against the belt to initiate the upward bending of the belt. A stud 241 mounts a roll 235' having an upper flange portion 235a' of a diameter substantially greater than the minimum diameter of the central portion 235b', but of a substantially smaller diameter than the lower flange 235c'. By using stud 241', roll 235', rolls 236, 237 and 238 (not shown in FIGURE 29), the transverse edge T of the upper run of the belt as it moves longitudinally past roll 235' will ride on the top of the adjacent upper flange portion 235c' of roll 235'.

Again referring to assembly 19 and as may be noted in FIGURE 1B, the roll 234 is located on one side of the belt 43 a substantial distance rearwardly of the next most adjacent roll 235 which is located on the opposite side of the belt. Due to the locations of the forementioned rolls 234, 235, they initiate the folding action of the belt as will be described in greater detail hereinafter. The remaining rolls are usually mounted to have their rotation axis successively closer to the center axis of the belt travel as the upper run moves toward the forward end.

BAR CUT OFF ASSEMBLY

The former roll assembly having been described, the structure of the bar cut off assembly 20 will now be set forth. The bar cut off assembly is located at the forward end of the machine and is illustrated in FIGURES 1B, 2B, 11–16 inclusive. The assembly 20 includes a carriage 250 having a flat horizontal platform 251 with a leg 252 depending from each corner portion thereof. On each leg there is mounted a wheel 253, the wheels on one transverse side of a platform riding on the longitudinal rail 254 and on the opposite side riding on the longitudinal rail 255. Each rail at its opposite ends is bolted to a bar 256. One of the bars is mounted on the cross bar 35 while the other bar is mounted on the cross bar 36.

One end of an elongated block 260 is secured to the platform to depend therefrom. The opposite end of the block has a threaded aperture 261 that forms a matching fit with the central threaded portion of the longitudinally extending screw shaft 262. One end of the crank shaft is journaled for rotation in a bearing 263 mounted on the brace 36 while the opposite end of the shaft extends through the cross brace 35 and is journaled for rotation in a bearing 264 which is mounted on the brace 35. A hand wheel 265 is secured to the last mentioned end of the shaft 262. An adjustable annular stop 266 is secured to the shaft at either end of the threaded portion of the shaft to limit the longitudinal movement of the carriage, the rotation of the shaft causing the block 260 and the carriage to move in a longitudinal direction. The purpose of providing the screw mechanism for moving the carriage in a longitudinal direction will be set forth hereinafter.

Mounted on the platform for rotation to cut the roll of material on the belt are four generally flat cut off wheels, said wheels being designated 271, 272, 273 and 274 respectively. The two wheels at one end of the platform, wheels 271 and 272 cooperate to partially cut the roll of material while the two wheels 273 and 274 at the opposite end of the platform likewise cooperate to finish the cut of the roll of material.

Since each one of the wheels is of similar construction, other than the shape of the blades mounted thereon, only wheel 273 will be described in detail. The wheel 273 includes an annular hub 280 that is keyed to the upper end of the drive shaft 277 (see FIGURE 14). The flat annular blade mount 281 is retained in position on the hub to rotate therewith by conventional means as a set screw. Around the peripheral portions of the blade mount, there are provided a plurality of elongated and inwardly extending radial grooves 282, each of which has a Teflon blade and an insert 284 mounted therein. Blades 283 are mounted in the grooves of wheels 271 and 273 while blades 290 are mounted on wheels 272 and 274. Each blade 283 has a notched out portion 283a that has an edge resting on the bottom of the groove whereby the diagonally cut beveled edge 283b is located a substantial distance radially outwardly of the outer circumferential surface of the blade mount.

The insert 284 has a notched portion 284a. The insert is positioned in the groove and has a flat surface thereof that bears against the adjacent surface of a blade and the notched out portion facing in a direction opposite said blade. The insert bears against the blade to clamp the blade intermediate the insert and the side wall of the groove. In order to provide a clamping fit, a conventional Vise-lok wedge 286 is secured to the blade mount by a cap screw 287 so that when the screw is tightened the wedge bears against the notched surface of the insert and thereby forms a pressure fit against the blade. The cap screw is extended through the wedge and threaded into the blade mount. If it is desired to reset the blade, for example, move it outwardly in a radial direction, the cap screw may be unthreaded and the wedge will be loosened to permit removal of the insert or blade or adjust the blade.

It is to be noted that the construction of blades 290 differs from blades 283 in that the blades 290 of the wheels 272 and 274 are diagonally cut at 290b in an oppositely inclined angle and have a notched out portion 290a located on the opposite side from that of blade 283. As a result, when the blades 283 and 290 are mounted in respective wheels, the beveled portions substantially formed a matching fit when the blades of each adjacent wheel are located to have the elongated axis thereof in substantially the same place as shown at positions M and R.

Each of the wheels 271, 272, and 274 are mounted on a shaft 270, the construction corresponding to shaft 277 other than for a lower splined extension 312. The shafts 270 and 277 are extended up through elongated apertures (not shown) in panel 310 to permit movement of the carriage relative panel 310 and panel portions 327. The structure for mounting each of the shafts 270 and 277 is the same, so therefore, only structure for mounting shaft 277 will be described. A spacer 278 is provided on the shaft intermediate the hub 280 and the upper bearing 276, the upper bearing being retained in a carriage platform aperture. The shaft extends downwardly through the carriage platform aperture and has mounted on the lower end portion thereof a second bearing 276 in the lower end of the annular retainer 275 that is welded to the platform in depending relation thereto.

A drive gear 295 is keyed to the lower end of the shaft 277 and mounted in intermeshing relationship with the intermediate gear 296 keyed to the lower end of the shaft 297. The shaft 297 is mounted in depending relation to the platform 251 by a pair of spaced bearings 298 and annular retainer 299 similarly as the shaft 277 is mounted on the platform, it being noted that the upper end of the shaft 297 does not extend above the platform. The gear 296 is mounted in intermeshing relationship with the gear 300 keyed to the lower end of the shaft 270 of the wheel 272. By providing the forementioned gears 295, 296, and 300, the wheels 272 and 273 are simultaneously rotated in the same direction.

Mounted on the lower end of stud shaft 303 is a small gear 302 that is driven by the drive gear 295 at a location 90° relative to the meshing of gears 295 and 296, said shaft 303 being mounted on the block 304 that is welded to the under surface of the platform 251. A second small gear 305 is mounted on a second stud shaft 303 which also is mounted on block 304, the gear 305 being driven by a gear 303. The gear 305 drives the gear 306 of the wheel 274. By providing a pair of small gears 302, 305 the wheel 274 is driven to rotate in a direction opposite the direction of rotation of the wheel 273. The wheel 271 is rotated in the same direction as the wheel 274 due to the provision of a second set of small gears 302, 305 which are mounted on stud shafts 303 that in turn are secured to a block 304. Thus, each of the wheels 274 and 271 are caused to rotate in a direction of the arrow 309 while the wheels 272 and 273 are rotated at the same angular rate in the direction of the arrow 308.

As may be noted in FIGURE 11 the upper run of the belt passes beneath the outer peripheral portions of each of the forementioned wheels and over the top surface of the platform 251, the upper run riding in the recessed portion of the panel 310 which is mounted on the platform 251 (see FIGURE 16). The rate of travel of the belt is synchronized with the angular movement of the wheels so that the candy bars are cut without causing jamming. It is to be mentioned that the angular spacing of each set of adjacent blades on a wheel together with the radial distance of the beveled edge of the blade from the rotary axis of the wheel determines the longitudinal length of the bar that is formed by the bar cut off assembly.

In order to drive the drive shaft 277, it has a splined extension 312 formed integrally therewith at the lower end of the shaft. The joint member 313a of the universal joint 313 is telescopically mounted on the shaft extension for vertical movement relative thereto and in angular driving engagement therewith. The joint member 313b is connected to the upper end of the connecting rod 314 to be rotated thereby while the lower end of the connecting rod has one member of the universal joint 315 secured thereto. The other member of the universal joint 315 is mounted on a drive shaft 316 of the gear motor 317 for rotating the connecting rod. The motor 317 is bolted to the mounting plates 319, one end of which is welded to the lower cross bar directly beneath the brace 35 and the other end being welded to the lower cross bar located beneath the brace 36.

CONVEYER BELT ASSEMBLY

The structure of the cut off bar assembly having been described, the structure of the conveyer belt assembly 18 will now be set forth (see FIGURES 1A, 1B, 2A, 4, 12, and 13). The conveyer belt assembly includes a large pulley 324 journaled for rotation on a shaft 325 that is secured to a frame member 190 at a location that the shaft 325 is located directly beneath the impeller 52. The belt 43 is extended around the large pulley, the rear portion of the upper run 43a passing through the aperture 328 of the panels 39. The upper run rides over the panel portion 39a. The portion of the upper run intermediate the pulley 324 and the second caramel station is in a flat horizontal condition. However, shortly after it passes beneath the second caramel station, the belt starts to curve upwardly at the outer transverse edges due to the location of the staggered former rolls of the roll former assembly. The transverse edges of the belt are slightly overlapped as it passes between the rolls 235, 236. After the belt has passed between the rolls 238 and 239, it starts to unfold so that by the time it is passed over the cross brace, it is again in a flat horizontal condition, the upper run between braces 34 and 35 being slightly upwardly inclined in a forward direction. After passing over brace 35, the upper run then passes between the carriage platform and the bar cut off wheels mounted on the carriage platform.

The upper run 43a extends over the horizontal roller 335 that is journaled for rotation in the generally U-shaped roller mount 336. The roller mount for roller 335 is bolted to bar 256 mounted on a cross brace 36. It is to be noted that a second horizontal belt roller 334 is journaled for rotation in a generally U-shaped roller mount 336 which is mounted on a bar 256 that in turn is mounted on the cross brace 35. The roller 334 supports the upper end of the belt just prior to its moving beneath the cut off wheels 271, 272.

The belt after passing over the belt roller 335 then extends vertically downwardly along the run 43b and then around a belt drive pulley 338 mounted on shaft 339. The shaft 339 is journaled for rotation in a pair of bearing members 341, one of the bearing members being mounted on each of the end uprights. A pulley 342 is keyed on the shaft 339 for driving said shaft, there being a belt 347 extended around the pulley 342, then over the brush drive pulley 343 in driving engagement therewith, and around the pulley 349 that is keyed to the motor drive shaft of the variable speed motor 346. The motor 346 is bolted to plates 319.

The brush drive pulley 343 is keyed to one end of the brush drive shaft 344, the brush 348 being keyed to the opposite end of the shaft to bear against the surface of the belt 43 which passes around the belt drive pulley 338. The brush drive shaft is journaled for rotation in a pair of transversely spaced shaft mounts 345 that are welded to the plate 319.

By providing the above described drive structure, the motor pulley is rotated in the direction of the arrow 352 which drives the brush shaft pulley to rotate in a direction 353 and the belt drive pulley 338 to rotate in the direction of the arrow 354. The bristles of the brush 348 at the point of contact with the belt 43 move in a direction opposite of the movement of the belt around the pulley 338 at the place of contact of the surface of the belt that carries the material for forming a candy bar. Thus, the brush serves to keep the belt clean.

The conveyer belt after leaving the pulley 338 is extended forwardly and upwardly in a direction along the run 43e and then is reversely bent over the pulley 356 that is journaled for rotation in the pulley mount 357. The pulley mount is secured to an upright 27. The belt after passing over the pulley 356 travels in a rearward direction (direction of the arrow 360) throughout the length of the lower run 43c. The lower run of the belt passes over the idler pulley 361 which is journaled for rotation in the pulley mount 362 mounted on the upright 26 that has the cross brace 34 secured thereto. From pulley 361 the lower run 43c passes beneath the belt tensioner pulley 363 that is mounted on the mid portion of the longitudinal frame member 22d and then passes over the idler pulley 364 mounted on the upright 26 to which the cross brace 33 is secured. From pulley 364 the lower run extends around the large pulley 324.

POWER CIRCUITRY

The power circuitry includes a pair of main power inlet lines $L_1$, $L_2$ connected to the variable speed, main drive motor 503, there being a master ON–OFF switch 501 on the control panel 502 in the line $L_1$ for starting and stopping motor 503. The motor 503 through the drive connection 504 drives the alternator 505 which in turn supplies the power for operating the other motors described heretofore (other than the air motor).

The alternator supplies power to lines 506 and 507, line 506 being connected to junction 510. The line 507 is connected to the secondary ON–OFF switch 508 which in an ON position completes a circuit to line 509 which in turn is connected to junction 511. Line 512 extends between junctions 511 and 515, junction 513 being on line 517. There are also provided junctions 520, 521 and 522 on line 517.

Line 527 connects junction 510 to junction 514 on line 516, there also being junctions 518, 519, and 520 on line 516. Lines 523 and 524 which are connected to junctions 520 and 522 respectively, supply power to motor 119, while lines 525 and 526 which are connected to junction 519 and 521 respectively supply power to motor 317. Lines 528, 529 are connected to junctions 520 and 518 respectively for supplying power to motor 346.

A line 530 is also connected to junction 511 while line 531 is connected to junction 510. Junctions 532, 533, 534, and 535 are provided on line 530 while junctions 536, 537, 538 and 539 are provided on line 531. Line 543 connects junction 536 to motor 66 while junction 535 is connected to said motor by line 541, there being an ON–OFF switch 542 on the control panel in line 541. Line 544 connects junction 537 to one of the motors 209 while line 545 connects junction 534 to the same motor, there being an ON–OFF switch 546 on the control panel in line 545. Line 548 connects junction 538 to the second motor 209 while line 550 connects junction 533 to the same motor, there being a switch 549 in line 550. Line 552 connects junction 539 to motor 117 while line 553 connects junction 532 to said motor, there being a switch 554 in line 553.

Upon closing switch 501 and with the other ON–OFF switches in an open position, the alternator is started. Then upon closing switch 508, power is furnished to motors 119, 317 and 346 to drive the extruder head, the bar cut off wheels and the conveyer belt, respectively, through the structure described heretofore. However, motor 66, 209, 209 and 117 are not started until switch 542, 546, 549 and 554 respectively are closed. Switches 542, 546, 549 and 554 respectively are normally closed in the order listed once the machine is to be operated to form a confectionery product.

Since motor 503 is variable speed motor, by changing its spee dthe number of cycles per minute produced by the alternator may be varied and thereby change the speed of motors 66, 209, 209, 117, 346, 317 and 119 to thereby vary the number of bars per minute produced by the machine. Also, since motors 66, 209, 209 and 117 are variable speed motors, their speeds may be varied independent of the change of speed of motor 503.

OPERATION OF MACHINE

The structure of the candy machine of this invention having been described, the operation thereof will now be set forth. As will become more apparent hereinafter, the machine of this invention may be used for manufacturing different types of confectionery products; however, in order to illustrate the operation of the machine it will be assumed that a salted nut roll type of candy bar is to be made. The final product is to have a nougat center that is coated with caramel and a layer of salted nuts, at least partially embedded in the caramel.

The impeller 52 through its associate drive structure is caused to rotate in the direction of the arrow 55 (FIG. 4) to thereby deposit a layer of salted peanuts or other appropriate type of nuts (crushed or otherwise) on the belt 43. The side walls of the dispenser housing extend forwardly of the impeller and together with the vertical guides 58 at either transverse side of the belt which serves to retain the nuts on the belt while the position of plate 56 in conjunction with the rate per minute of the impeller controls the rate of discharge of the nuts onto the belt. As the upper run of the belt advances in the direction of the arrow 401, it travels over a vibrator 13 which spreads the nuts in an even layer 402 as illustrated in FIGURE 17. The guides 58 end forwardly of the vibrator. Next, the belt travels under the carmel dispenser nozzle 202 at the caramel dispenser station E.

The caramel is heated in the tank and held at a temperature between 120°–130° F., the mechanism described heretofore keeping the caramel within the aforementioned temperature range. If the caramel is too hot, it tends to melt the nougat which is deposited on the belt, while if it is too cold, it does not properly adhere to the peanuts.

The caramel pump 199 draws caramel out of the tank and forces it through line 201 into the caramel nozzle 202. The caramel nozzle is adjusted by setting screw 224 and locking it in position so that there is extruded a thin layer of caramel, for example, approximately .020 of an inch thick on the layer of nuts, this layer of caramel being designated 405 and illustrated in FIGURE 18. The first caramel layer 405 is not as wide as the width W of the nut layer and is of a width less than the transverse spacing between the adjacent ends of the retainers 163.

In the event that the chunks clog the effective opening of the nozzle, the handle 217 is loosened and the sleeves rotated relative to one another to increase the effective opening. As a result, the chunks pass through the enlarged effective opening to "clear it" without having to stop the machine. After the opening is cleared, the sleeves are again rotated so that adjusting screw bears against the slot wall and the handle 217 is tightened.

As the upper run advances from the first caramel station, it then passes beneath the extruder head to have a nougat center piece deposited thereon. The nougat is made a day ahead and then "set" and cooled to give it body. The nougat to be extruded is placed in the chamber 82 of the nougat tank wherein due to the operation of the two drums 90 and 91 that rotate in opposing directions (directions of the arrows 112 and 113 respectively) places the nougat under high pressure to squeeze the air out and change its texture so that it becomes creamy. This breaks the "set" down and also forces the nougat under pressure through the opening 81 into the chamber 80 of the bottom member. Due to the drums 90 and 91 being rotated at a constant angular velocity, the nougat in the chamber 80 is retained under constant pressure and is forced into the chamber in the extruder head under constant pressure so as to be extruded at a constant rate to form nougat portions of equal radial dimensions for one complete revolution of the head. It is constantly forced outwardly through the apertures 124 formed in the extruder head. The apertures are of a width and circumferential length to form a piece of nougat of a width X and a length L (see FIGURE 19).

The extruder head 116 is rotated in a direction of the arrow 408 and as it rotates past the rotating wire 162 all the nougat that has been extruded radially outwardly from the adjacent aperture is cut off as the nougat passes the wire. As the extruder head advances past the wire 162, the nougat is extruded radially outwardly through the aperture and as the head continues to rotate the outer surface of the nougat is forced further outwardly from the head so that at the time the same aperture has again rotated to wire 162, the radial dimension of the nougat extending outwardly, of the head and wire 162 is of the height Y. The dimension Y is usually varied by varying the rate of rotation of the extruder head but also may be varied by varying the rate of rotation of the extruder drums. The wire 162 is rotated at a high velocity (for example 2,000 revolutions per minute in the direction of arrow 409) and cuts the nougat as it is moved angularly past the wire. The cut portions of the nougat are deposited on the conveyer belt and since the rate of travel of the conveyer belt is synchronized with the rate of rotation of the extruder head and it is cut at a radial line of the head that is perpendicular to the belt, the cut portion of the nougat is moved forwardly away from the wire without stretching or retarding relative to the uncut portions. Due to the angular spacing of the apertures 124, the nougat center 411 is positioned on the belt at equally spaced intervals (see FIGURE 19). Although a nougat cut off device utilizing a reciprocating wire that reciprocates in a transverse direction and mounted for limited reciprocating longitudinal movement could be used, it is preferred that the rotating wire be used since a reciprocating wire tends to transversely displace the nougat and it cannot satisfactorily be operated at as high speeds as the nougat cut off assembly of this invention.

As the belt passes beneath the cutting wire, a piece of nougat 411 is deposited on top of the first layer of caramel 405 in a transversely centered position. As an example of the size of the nougat center piece, it may be approximately two inches long and spaced an inch apart. Next, a little further along the belt in advance of the extruder head there is a second caramel depositing station F. The nozzle at the second caramel station that has slots 219, 220 of a longer axial length than those of the nozzle at the first caramel station deposits a continuous ribbon of caramel 412 that runs along the top of the nougat and therebetween, and is of a width nearly as great as that of the layer of nuts. The purpose of providing a second layer of caramel is to give a good lap at the top of the nougat material when the assembly of material on the belt is subsequently rolled up and binds the portion of the layer of nuts not covered by the first layer. Although the first layer of caramel could be the wide layer and the second layer the narrower layer, it is preferred that the first layer be the narrow one since on occasion, if the first layer were the wide one, it occasionally retains a nut in a position that it would hit a wire retainer and cause the caramel to roll up on the wire retainer.

After the belt has passed through the second caramel station it is caused to be bent upwardly at its outer transverse edges due to the successively closer staggered spacing of the former rolls 234–239, the rolls 234, 236 and 238 being located on one side of the belt and the rolls 235, 237 and 239 being located on the opposite side of the belt. Thus, after the belt moves between the two caramel stations, the outer transverse edges thereof may be slightly bent in an upward direction together with the edges of the second caramel layer as indicated at 406 in FIG. 20. As the belt approaches the former rolls, it is progressively further upwardly bent as illustrated by FIGURE 21 wherein the first caramel layer is pressed against the second caramel layer to completely encase each nougat center piece with a layer of caramel. As the belt progresses between the rolls 235 and 236, one edge of the belt is overlapped over the other transverse edge so as to be completely wrapped around the then outer layer of nuts, and first caramel layer. At the FIGURE 22 position the nuts are brought around the nougat and lapped over the upper second caramel layer 412. This makes a firm pack of nuts at least partially embedded in the outer caramel which is in turn packed firmly around each nougat center. It is to be remembered, of course, that the nougat centers are spaced and therefore in some places along the belt there will be a layer of nuts with the first caramel layer encasing only the second caramel layer. The reason for this is that first caramel layers are to be wrapped a little bit over the ends of the nougat so that when the bars are cut off, the ends of the nougat center will be completely covered with caramel and nuts. As the belt is successively passed between rollers 236, 237, rollers 237, 238, and rollers 238, 239, the roll of candy material is more firmly packed since each of the forementioned rollers are a little bit closer to one another as mentioned heretofore. As the belt passes between the rollers 238 and 239, it is again permitted to unfold as it moves toward the bar cut off assembly 20.

After the belt unfolds there is left a run of cylindrical shaped material 418 as illustrated in FIGURE 23. The run (roll) of cylindrical material 418 is continuously formed and is made up of an annular layer of nuts 415 embedded in caramel, an inner annular layer 416 that is primarily caramel and a series of longitudinally spaced nougat centers 411.

The upper run of the belt 43 in moving from the former roll assembly is inclined slightly upwardly as it is moved over the roller 334. Due to this portion of the belt being upwardly inclined, it is flattened out and is in a flat condition as it passes over the roller 334. The thus flattened run passes beneath the wheels 272 and 271 wherein as it advances a blade on each respective wheel is moved more closely adjacent to the corresponding blade on the other wheel and at an angular momentum to correspond to the rate of travel of the roll 418 of the cylindrical material on the belt. If there are two sets of wheels being used, then the aforementioned cooperating pair of blades partially cut the cylindrical roll between two adjacent nougat center pieces at M, the cooperating pair of blades being slanted in opposite directions so as to more positively retain the cylindrical material on the belt. As a cooperating pair of blades pass the position M (see FIGURE 11), they begin to be moved apart and withdrawn from the cut formed in the cylindrical roll. The partially cut cylindrical roll is moved so that the cooperating pair of blades at P begin to enter the partially formed cut that is formed at position M of the blades of the wheels 273, 274 and complete the cut at position R so that the nut roll illustrated in FIGURE 24 is formed having the outer nut layer 415a surrounding the caramel layer 416a and nougat center 411 and the length Z. The blades after moving to position R are then retracted from the cut off bar which subsequently falls off of the belt onto appropriate conveyor mechanism (not shown) as a belt passes over the roller 335. It is to be mentioned that the blades in forming the cut inwardly fold the caramel and layer of nuts to completely encase the ends of the center nougat pieces.

If in starting the machine the cooperating pair of blades cut the cylindrical roll in a position that leaves an end of the nougat centers exposed, then the hand wheel 265 is rotated to longitudinally move the carriage assembly 250 in the appropriate direction of the double arrow 425 a sufficient amount so that the blades at the position M will be located intermediate adjacent nougat center pieces. The aforementioned movement of the carriage takes place due to the provision of the threaded portions of the shaft 262 and the upright block 260 and the provision of the wheels 253 that travel on the rails 254 and 255. The longitudinal movement of the carriage does not interrupt the drive thereof since the universal joint 313 moves vertically relative to the spline extension 312 and the second universal joint 315 permits the connecting rod 314 to be positioned angularly relative to the drive shaft 316 of the motor 317.

The cooperating set of cut off wheels 272, 271 and 273, 274 are positioned on the carriage such that the blades at position M and position R will be located in parallel planes to form a cut at the same place along the cylindrical length on the belt. It is to be mentioned that if desired only one set of wheels (for example wheels 273, 274) may be used. In such a case, the wheels 273 and 274 would completely cut the individual bar of FIGURE 24 from the roll 418. If only wheels 273 and 274 are used, (see FIGURE 30), then it is desirable to mount a roller 700 on each transverse side of the belt to bear against the upper outer transverse edges thereof just as it passes over roller 335 to insure that the belt flattens out. The rollers 700 bear against the portion of the belt on which there is no confectionery material and are journaled in spaced brackets 701 that in turn are secured at 702 to bar 256.

Each of the variable speed motors is connected to a control panel (not shown) mounted on a frame to insure that they are operated at a constant r.p.m. once the variable speed mechanism of each motor has been adjusted properly to form a nut roll bar of this invention. Thus, the variable speed motors are adjusted to synchronize the rate of travel of the belt 43, the angular rate of movement of the cut off wheels, the rate of delivery of the caramel through the caramel pumps, the rotation of the extruder wheel, and the rotation of the impeller.

In first starting the machine, it is necessary to see that the nut dispenser and caramel tanks are full of the product, and that the nougat is ready to be placed in the nougat hopper. After starting the machine, the valves (not shown) to the caramel tank are open to allow the caramel to pass into the pumps. When there is an indication of caramel coming out of the slots 219, 220 the nuts are allowed to flow on to the belt and the nougat hopper is filled with nougat. Each station is checked to see that the proper material flow is passing onto the belt. For example, the vibrator station is checked to see that the peanuts completely cover the belt and the caramel nozzles are checked to see that there is no foul-up whereby each layer of the caramel is not placed down in a continuous ribbon. Additionally, the roll former is checked to see that they are properly tensioned and all foreign matter is removed from these rolls. Additionally, the rolls of the roll former are occasionally checked to see that there is no build-up of material.

Although the descriptions of the operation of the machine has been described relative to making a salted peanut roll, it is to be understood that there are other types of nuts such as, for example, cashews, pecans, or walnuts which may be used. Additionally, by making appropriate modifications of the dispenser assembly, shredded cocoanut, Rice Krispies, or beads of candy (nonpareil) may be used in place of the nuts deposited on the belt at the nut dispensing station. At the caramel dispensing station, other materials such as marshmallow or chocolate may be deposited on the layer of material deposited at the nut dispensing station.

By proper modification of the extruder head or using other types of extruders, a center other than nougat may be deposited. For example, in place of the nougat, marshmallow, taffy, jelly, chocolate or peanut butter paste may be used. Thus, the machine of this invention may be used to form a number of different types of candy bars or related confectionery type products.

Basically, the method disclosed herein for forming a nut roll (or related product) comprises depositing a layer of nuts, a layer of caramel, then depositing a nougat center at spaced intervals, next depositing another layer of caramel material, then rolling the sides of the belt so as to completely encase the center pieces and form an outer nut casing and finally cutting and wrapping the nut covering around the ends of the center material. Although the aforementioned steps are the preferred manner of making a confectionery product, some confectionery products can satisfactorily be made by eliminating the second caramel depositing step (depositing a wide layer of caramel at station E and none at station F).

In forming nut rolls of this invention, the machine may be modified to use reciprocating knives in place of the cut off wheels and use a different type extruder, but it is preferred that the rotary wheels, extruder and nougat cut off illustrated be used as the described machine may be operated at a much higher rate of speed than such modified machines. For example, the machine as described and illustrated will form approximately 220 bars per minute.

As many widely apparently different embodiments of this invention may be made without departing from the spirit and scope thereof, it is to be understood that we do not limit ourselves to the specific embodiments herein.

What is claimed is:

1. Apparatus for forming a confectionery product comprising a longitudinally extending frame, an endless belt having an upper run mounted on said frame, to have the upper run move in a longitudinal direction, means for driving said belt in the aforementioned manner, means for depositing nuts on the rear portion of said upper run to provide a layer of nuts on the upper run, means mounted on the frame for retaining a quantity of caramel, caramel conveying means connected to said caramel retaining means for depositing a layer of caramel on said layer of nuts, extruder means mounted on the frame in advance of the caramel conveying means for continuously extruding a stream of nougat of a given width and thickness, cut off means for cutting nougat center pieces of a selected length from said nougat stream to fall on the caramel layer in regularly spaced intervals, means mounted on the frame in advance of the extruder means for shaping the upper run to form a roll of the material deposited on the belt and means on the frame for cutting the roll of material intermediate the nougat center pieces.

2. The apparatus of claim 1 further characterized in that the extruder means includes a nougat tank mounted in the frame, a rotating extruder head mounted on the tank in fluid communication therewith and extending over the center portion of said upper run, said extruder head having an annular portion with a plurality of circumferentially spaced apertures therein through which the nougat is extruded, and drive means connected to the extruder head for rotating it.

3. The apparatus of claim 1 further characterized in that the extruder means includes an extruder head located above the upper run and that the nougat cut off means includes a wire extending transverse of the belt and means for mounting said wire adjacent the extruder head above the belt and rotating said wire to cut a piece of nougat extruded by said extruder head.

4. The apparatus of claim 1 further characterized in that said bar cut off means includes a pair of transversely spaced cooperating cut off wheels, means for rotatingly mounting said wheels on the frame, and means for synchronizingly driving said wheels, ach of said wheels having a plurality of circumferentially spaced radially extending blades.

5. The apparatus of claim 4 further characterized in that a pair of longitudinally extending rails are mounted on the frame beneath the wheel mounting means and that the wheel mounting means includes a carriage mounted for longitudinal movement on said rails and means connected to the frame for adjusting the longitudinal position of said carriage on the rails and holding the carriage in said adjusted position.

6. The apparatus of claim 4 further characterized in that a pair of longitudinally extending rails are mounted on the frame beneath the wheel mounting means and that the means for shaping the upper run includes a plurality of rolls and means rotatably mounting said rolls on the frame, said rolls being mounted on the roll mounting means in staggered longitudinal spaced relation with the longitudinally successive adjacent rolls being mounted on opposite sides of the belt to cause it to overlap at its outer transverse edges.

7. The apparatus of claim 1 further characterized in that a second means is connected to the caramel retaining means for continuously depositing a layer of caramel on the material on the upper run intermediate the extruder means and the shaping means.

8. An extruder assembly comprising a container for holding a supply of extrudable material, said container having means forming a main chamber and a bottom member forming a second chamber with an inlet opening into the main chamber and an outlet opening, means mounted on the main chamber for forcing said material through the inlet opening into the second chamber under pressure, an extruder head having an annular portion with an outlet aperture therein, said head having a hollow interior opening both to said aperture and said outlet opening, said bottom member having means for rotatably mounting said extruder head, the last mentioned means having the outlet opening formed therein and means connected to the extruder head for rotating it.

9. For forming individual pieces of extruded material, a frame, an extruder assembly mounted on said frame, said extruder assembly comprising means forming a main chamber for containing an extrudable material, and an extruder head having an annular portion with a plurality of circumferentially spaced apertures, said head having a hollow interior opening into said apertures and an inlet opening into said interior, means connected to the main chamber for rotating said extruder head and conducting the extrudable material from the main chamber into the inlet, means mounted in the main chamber for forcing said material from the chamber through the extruder head rotating means and into the hollow interior of the extruder head under pressure and means for drivingly rotating said extruder head, and a cut off assembly mounted on said frame adjacent said extruder head, said cut off assembly comprising a wire, means rotatably mounting said wire adjacent said extruder head to cut off the material extruded through an aperture as the extruder head is rotated and means drivingly connected to the wire mounting means for rotating it.

10. Apparatus for forming a confectionery product comprising a frame elongated in a longitudinal direction, a continuous belt mounted on the frame and having an upper run, means on the frame for driving said belt to move the upper run in a forward longitudinal direction, a nut dispenser assembly mounted on the frame for dispensing a layer of nuts on the rearward portion of the upper run, an extruder assembly for extruding nougat above the transverse center portion of the upper run, means mounted on the frame acting in cooperation with the extruder assembly for cutting nougat center pieces from the extruded material to be disposed on the belt at spaced intervals, vibrator means mounted on the frame intermediate the nut dispenser assembly and the extruder assembly for vibrating the nuts on the belt to form an even layer of nuts, means mounted on the frame for holding a supply of caramel, means mounted on the frame and connected to the caramel supply means for conveying caramel therefrom to a position above the belt and discharging caramel into the nuts to form a layer of caramel thereon, means mounted on the frame in advance of the extruder assembly for wrapping the belt around the material thereon, to form a roll of confectionery material and means mounted on the longitudinally forward end of the frame for cutting the roll of confectionery material into individual bars of confectionery product.

11. The apparatus of claim 10 further characterized in that the last mentioned means includes a carriage, means mounting said carriage for limited longitudinal movement on the frame, said upper run being mounted to travel over the carriage, means mounted on the carriage for movement therewith for cutting the roll of material in the belt as it passes over the carriage and means connected to the carriage for selectively moving the carriage relative to the frame to a position such that the bar cut off means cuts between the nougat center pieces and means for operating the bar cut off means in synchronism with the movement of the belt and the disposing of the nougat center pieces on the belt.

12. The apparatus of claim 11 further characterized in that the nougat cut off means includes at least two blades each having beveled cutting edges and means mounting each blade for movement over the belt to cooperatively cut the roll of material and fold the severed sections of the caramel layer over the ends of the nougat center pieces.

13. The apparatus of claim 11 further characterized in that the caramel conveying means includes a discharge nozzle and means for forcing the caramel from the supply means into said nozzle, said nozzle having means forming a discharge opening of a selectively variable width to provide a layer of controlled thickness on the belt.

14. The apparatus of claim 13 further characterized in that the extruder assembly includes container means holding a supply of nougat, an extruder head adjacent the nougat cut off means, means mounted on container means for conveying nougat from the nougat container means into the extruder head, and means for forcing the nougat from the container through the nougat conveyer means into the extruder head, the nougat forcing means including means movably mounted in the container means for forcing nougat under constant pressure into the nougat conveyor means, and means in the frame for driving the constant pressure means in synchronism with the movement of the upper run.

15. The apparatus of claim 14 further characterized in that the discharge nozzle includes concentrically mounted sleeves each having an axially extending discharge slot and means connected to said sleeves for adjustably setting the overlap of said slots to control the thickness of the caramel passed through the slots.

16. The apparatus of claim 14 further characterized in that the extruder head has an annular portion that has a plurality of circumferentially spaced apertures formed thereon and a portion rotatably mounted in the nougat conveying means to rotate about a horizontal axis, and drive means connected to the extruder head for rotating the head, said extruder head drive means driving the head in synchronism with the movement of the upper run, said nougat conveyer means mounting said extruder head for revolving the apertures thereon continuously past the nougat cut off means to have the nougat extruded through the respective aperture cut from the body of material as the respective aperture is rotated to pass the nougat cut off means.

17. A caramel dispensing nozzle mountable on a line for conveying caramel comprising an elongated inner sleeve having an end wall at one end and an inlet opening at the other end, said inner sleeve having an elongated axially extending slot, an outer sleeve mounted on the inner sleeve and forming a close fit with the inner sleeve, said outer sleeve having an end wall adjacent the inner sleeve end wall and an elongated axially extending slot, each of the aforementioned slots being of rectangular shape and elongated in an axial direction, means interconnecting said end walls for permitting relative rotation of the sleeves to vary the effective opening through the aforementioned slots and alternately locking said sleeves against relative rotation, said outer sleeve having a circumferentially extending slot, a mount secured to said inner sleeve to be located within said circumferentially extending slot, and adjusting means on said mount for selectively limiting the maximum size of the effective opening through said axially extending slots and permitting said sleeves being rotated relative to one another to preclude material passing through said inner sleeve and outwardly through the outer sleeve axial slot due to the non-overlapping of the axial slots of said sleeves.

18. In a confectionery machine having a frame, a continuous belt having a longitudinally extending upper run for carrying confectionery material mounted on the frame, means on the frame for driving said belt and means for continuously depositing confectionery material on the upper run that is to be cut into individual pieces, the improvement being a cut off assembly comprising a platform, means mounting said platform on the frame to have the upper run of the belt move thereover, said platform mounting means including elongated rails mounted on the frame to extend generally parallel to the upper run, means connected to the plateform and traveling on the rails for mounting the platform for movement on the frame in a longitudinal direction and means connecting the platform to the frame for selectively adjusting the longitudinal position of the platform and retaining it in adjusted position, a first set of wheels each having radially extending circumferentially spaced blades and means mounting said blades on the aforementioned first wheels to have the blades extend radially outwardly therefrom, means mounting said first wheels on the platform in transverse spaced relationship for rotation to have a blade of each first wheel to cooperatively cut the material on the belt as it is moved between said first wheels and drive means for driving said wheel mounting means to rotate said wheels in synchronism with one another and with the movement of the upper run so that individual pieces of equal lengths are cut by the blades.

19. In a confectionery machine having a frame, a continuous belt having a longitudinally extending upper run for carrying confectionery material mounted on the frame, means on the frame for driving said belt and means for continuously depositing confectionery material on the upper run that is to be cut into individual pieces, the improvement being a cut off assembly comprising a platform, means mounting said platform on the frame to have the upper run of the belt moved thereover, a first set of wheels each having radially extending circumferentially spaced blades and means for mounting said blades on the aforementioned first wheels to have the blades extend radially outwardy therefrom, means mounting said first wheels on the platform in transversely spaced relationship for rotation to have a blade of each first wheel to cooperatively cut the material on the belt as it is moved between said first wheels, drive means for driving said wheel mounting means to rotate said first wheels in synchronism with one another and with the movement of the upper run so that individual pieces of equal lengths are cut by the blades, a second set of cooperating wheels each having a plurality of circumferentially spaced blades, means for rotatably mounting said second set of wheels longitudinally spaced from the first set and the wheels of the second set transversely spaced from one another, and drivingly rotating said second set, and means for driving said means for mounting and rotating said second set of wheels and thereby the second set of wheels in synchronism with the first set of wheels.

20. The structure of claim 19 further characterized in that each wheel includes an annular blade mounting member having a plurality of radially extending grooves in the outer circumferential portion thereof, an insert for each blade, there being a blade and an insert mounted in each groove, and wedge means for each blade releasably secured to the blade mounting member for forcing an insert against a blade to hold the blade in clamping engagement between the insert and a grooved portion of the mounting member.

21. In apparatus for continuously forming a confectionery product, a frame elongated in a longitudinal direction, conveyor means mounted on the frame for conveying confectionery material in a longitudinal direction, means mounted on the frame for depositing a layer of caramel on said conveyor means, means mounted on the frame for depositing nougat on the layer of caramel, means mounted on the frame for shaping the nougat and caramel on the conveyor means into a roll, means for depositing an additional layer of caramel on the nougat before the previously deposited caramel layer and nougat reach the roll forming means, and means mounted on the frame for cutting said roll into individual pieces.

22. In apparatus for continuously forming a confectionery product, a frame elongated in a longitudinal direction, conveyor means mounted on the frame for conveying confectionery material in a longitudinal direction, means mounted on the frame for depositing a layer of caramel on said conveyor means, means mounted on the frame for depositing nougat on the layer of caramel, said nougat depositing means including means for extruding nougat above the conveyor means and means cooperating with the nougat extruder means for forming individual pieces of nougat disposed at spaced intervals on the conveyor means in advance of the nougat extruder means, means mounted on the frame for shaping the nougat and caramel on the conveyor means into a roll, and means mounted on the frame for cutting said roll into individual pieces.

References Cited by the Examiner
UNITED STATES PATENTS

| | | | |
|---|---|---|---|
| 1,474,773 | 11/1923 | Fraser | 107—14 |
| 1,518,260 | 12/1924 | Hislop | 107—68 |
| 1,522,738 | 1/1925 | Miller | 107—54.6 |

(Other references on following page)

UNITED STATES PATENTS

| | | | |
|---|---|---|---|
| 1,542,710 | 6/1925 | Laskey | 107—54.6 |
| 1,730,006 | 10/1929 | Harrold | 83—677 X |
| 2,960,045 | 11/1960 | Pentzlin | 107—1.1 X |
| 2,967,493 | 1/1961 | Cloud et al. | 107—1.2 |
| 2,987,017 | 6/1961 | Pearson et al. | 107—69 |
| 3,032,152 | 5/1962 | Titsler | 83—698 X |
| 3,112,713 | 12/1963 | Jahn | 107—68 |

IRVING BUNEVICH, *Primary Examiner.*

ROBERT E. PULFREY, WALTER A. SCHEEL,
*Examiners.*